United States Patent
Hwang et al.

(10) Patent No.: US 9,407,298 B1
(45) Date of Patent: Aug. 2, 2016

(54) RADIO FREQUENCY (RF) ANALOG INTERFERENCE CANCELLATION (AIC) WITH MULTIPLE ANTENNAS

(71) Applicant: QUALCOMM Incorporated, San Diego, CA (US)

(72) Inventors: Insoo Hwang, San Diego, CA (US); Bongyong Song, San Diego, CA (US); Cong Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/639,673

(22) Filed: Mar. 5, 2015

(51) Int. Cl.
*H04B 1/44* (2006.01)
*H04B 1/10* (2006.01)
*H04B 1/16* (2006.01)
*H04B 1/525* (2015.01)

(52) U.S. Cl.
CPC ............... *H04B 1/10* (2013.01); *H04B 1/1036* (2013.01); *H04B 1/163* (2013.01); *H04B 1/525* (2013.01)

(58) Field of Classification Search
CPC ........ H04B 1/10; H04B 1/1036; H04B 1/163; H04B 1/525
USPC ........................................ 455/78, 63.1, 67.13
See application file for complete search history.

(56) References Cited

U.S. PATENT DOCUMENTS

| | | | |
|---|---|---|---|
| 6,819,911 B2 * | 11/2004 | Clelland | H04B 1/1027 455/296 |
| 7,248,657 B2 * | 7/2007 | Aromaa | H04B 1/1036 375/340 |
| 8,306,480 B2 * | 11/2012 | Muhammad | H04B 1/525 455/296 |
| 8,861,661 B2 * | 10/2014 | Fujimura | H04B 7/15542 375/349 |
| 8,953,725 B1 * | 2/2015 | Lee | H04B 7/15585 375/346 |
| 2013/0301688 A1 * | 11/2013 | Khandani | H04W 16/14 375/211 |
| 2013/0309975 A1 * | 11/2013 | Kpodzo | H04B 1/1027 455/63.1 |
| 2014/0247757 A1 | 9/2014 | Rimini et al. | |
| 2014/0269858 A1 | 9/2014 | Lukashevich et al. | |

FOREIGN PATENT DOCUMENTS

| CN | 103701510 A | 4/2014 |
|---|---|---|
| EP | 2577875 A1 | 4/2013 |

OTHER PUBLICATIONS

International Search Report and Written Opinion—PCT/US2016/019928—ISA/EPO—May 13, 2016.

* cited by examiner

*Primary Examiner* — April G Gonzales
(74) *Attorney, Agent, or Firm* — Loza & Loza LLP

(57) ABSTRACT

Aspects of the disclosure are directed to interference cancellation. A method of performing interference cancellation in a wireless communications device having one or more transmit antennas, one or more transmitters, one or more receive antennas, one or more receivers, one or more coefficient controllers and one or more analog interference cancellation (AIC) circuits includes using the one or more coefficient controllers for determining coefficients for one or more adaptive filters within the one or more AIC circuits.

29 Claims, 15 Drawing Sheets

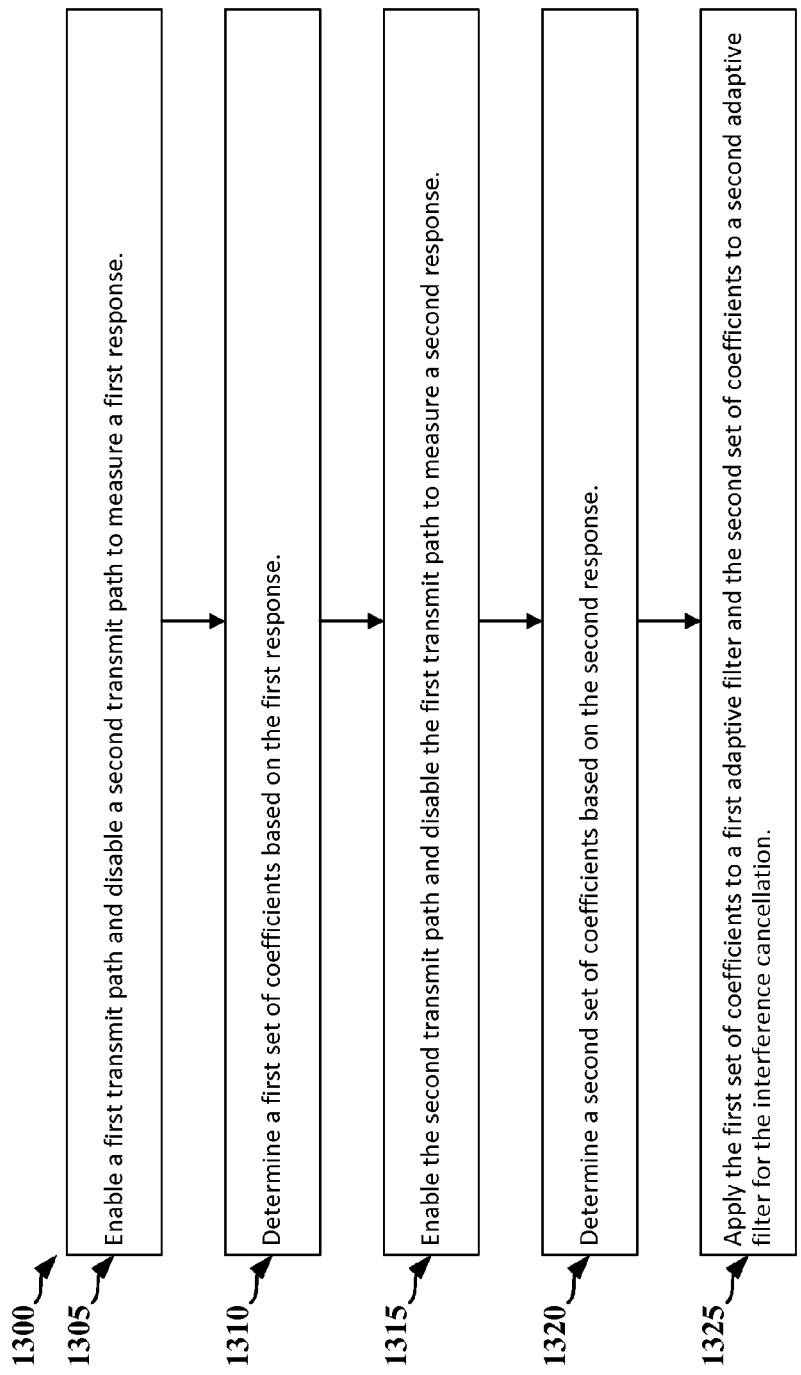

RADIO FREQUENCY (RF) ANALOG INTERFERENCE CANCELLATION (AIC) WITH MULTIPLE ANTENNAS

TECHNICAL FIELD

This disclosure relates generally to the field of interference cancellation systems and methods, and, in particular, to analog interference cancellation with multiple antennas.

BACKGROUND

Advanced wireless devices may have multiple radios that operate on the same, adjacent, or harmonic/sub-harmonic frequencies. The radios may provide access to networks such as wireless wide area network (WWAN), a wireless local area network (WLAN), a wireless personal area network (WPAN), Global Positioning System (GPS), Global Navigation Satellite System (GLONASS), etc. Some combinations of radios can cause co-existence issues due to interference between the respective frequencies. In particular, when one radio is actively transmitting at or close to the same frequency and at a same time that another radio is receiving, the transmitting radio can cause interference to (i.e., de-sense) the receiving radio. For example, same-band interference may occur between Bluetooth (WPAN) and 2.4 GHz WiFi (WLAN); adjacent band interference between WLAN and Long Term Evolution (LTE) band 7, 40, 41; harmonic/sub-harmonic interference may occur between 5.7 GHz ISM and 1.9 GHz Personal Communications Service (PCS); and an intermodulation issue may occur between 7xx MHz and a GPS receiver.

Analog interference cancellation (AIC) cancels interference between a transmitter radio and a receiver radio by matching gain and phase of a wireless coupling path signal and in a wired AIC path, as shown in FIG. 1, where $d_t$ is a transmitted signal from a transmitter (aggressor) radio 102, and $h_c$ is a coupling channel (wireless or wired coupling path signal) from the transmitter radio 102 to a receiver (victim) radio 104. AIC 106 attempts to cancel the impact of the coupling channel $h_c$ as reflected via the negative sign on the output of AIC 106.

Interference cancellation techniques are commonly used in wireless communication systems to improve performance where undesired transmit interference (i.e., local interference) couples into a co-located receiver. These techniques are generally based on a single antenna scenario where there is only one transmit antenna and one receive antenna at a single location. In this case, an analog interference cancellation (AIC) circuit in the receiver may be used to mitigate the undesired transmit interference by subtracting a filtered copy of the transmit interference (directly available from the co-located transmitter) in the receive path to cancel the undesired transmit interference. In many systems, multiple antennas are used to provide increased flexibility with M transmit antennas and N receive antennas. However, prior art multiple antenna systems require separate AIC circuits for each transmit-receive coupling path, a total of MxN paths. And, in other cases, separate coefficient controllers for generating coefficients to input to the separate AIC circuits are also required for each transmit-receive coupling path. Therefore, the motivation exists for more efficient analog interference cancellation techniques which require fewer than MxN AIC circuits and coefficient controllers.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to various aspects of the disclosure a method for interference cancellation, including utilizing a first receiver to receive a first signal in a first receive path and to measure a first response from the first receive path; determining a first set of coefficients based on the first response; utilizing a second receiver to receive a second signal in a second receive path and to measure a second response from the second receive path; determining a second set of coefficients based on the second response; determining a set of composite coefficients based on the first set and the second set of coefficients; and applying the set of composite coefficients to an adaptive filter coupled to the first receive path and the second receive path.

In various aspects, a method for interference cancellation, including enabling a first transmit path and disabling a second transmit path to measure a first response; utilizing a coefficient controller for determining a first set of coefficients based on the first response; enabling the second transmit path and disabling the first transmit path to measure a second response utilizing the coefficient controller for determining a second set of coefficients based on the second response; applying the first set of coefficients to a first adaptive filter and the second set of coefficients to a second adaptive filter for the interference cancellation.

In various aspects, a method for interference cancellation, including utilizing a first receiver to receive a first signal in a first receive path and to measure a first response from the first receive path, wherein the first response is associated with a first transmitter; determining a first set of coefficients based on the first response; utilizing a second receiver to receive a second signal in a second receive path and to measure a second response from the second receive path, wherein the second response is associated with the first transmitter; determining a second set of coefficients based on the second response; determining a first set of composite coefficients based on the first set and the second set of coefficients; applying the first set of composite coefficients to a first adaptive filter coupled to the first receive path and the second receive path; utilizing the first receiver to receive a third signal in the first receive path and to measure a third response from the first receive path, wherein the third response is associated with a second transmitter; determining a third set of coefficients based on the third response; utilizing the second receiver to receive a fourth signal in the second receive path and to measure a fourth response from the second receive path, wherein the fourth response is associated with the second transmitter; determining a fourth set of coefficients based on the fourth response; determining a second set of composite coefficients based on the third set and the fourth set of coefficients; and applying the second set of composite coefficients to a second adaptive filter coupled to the first receive path and the second receive path.

In various aspects, an apparatus for interference cancellation, including a first receiver for receiving a first signal in a first receive path; a second receiver for receiving a second signal in a second receive path; a coefficient controller for performing the following: measuring a first response from the first receive path; determining a first set of coefficients based on the first response; measuring a second response from the second receive path; determining a second set of coefficients based on the second response; and determining a set of composite coefficients based on the first set and the second set of coefficients; and an analog interference cancellation (AIC) circuit for applying the set of composite coefficients to an adaptive filter coupled to the first receive path and the second receive path.

These and other aspects of the present disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the present disclosure discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 13 is a flow diagram illustrating a second example of interference cancellation with multiple antennas.

DETAILED DESCRIPTION

Figure 1:
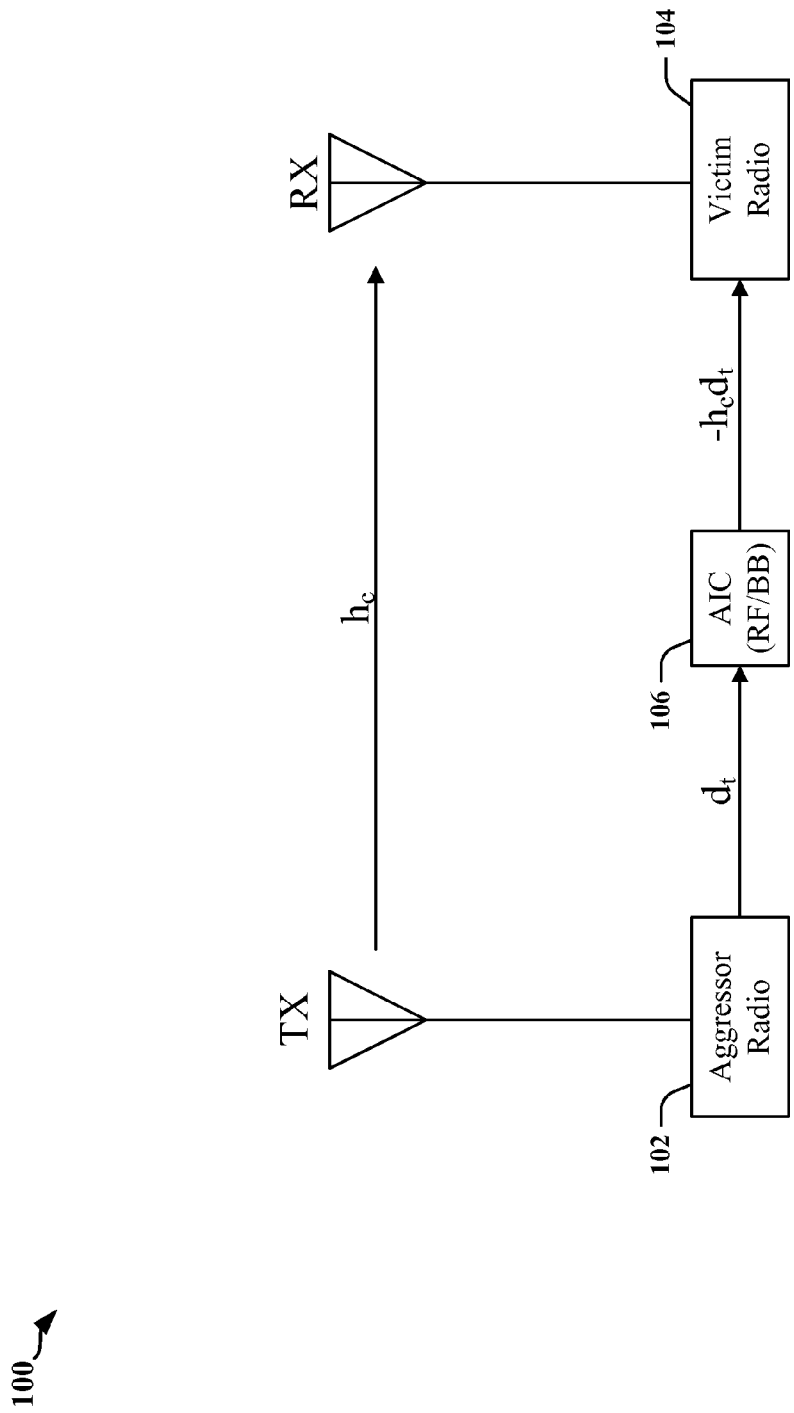
FIG. 1 is a block diagram illustrating an analog interference cancellation system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to systems and methods for cancelling local interference resulting from transmissions by one radio (transceiver) that affect the receiving performance of a second radio (transceiver) operating on the same or adjacent, harmonic/sub-harmonic frequencies, or intermodulation product frequencies. In particular aspects, an interference cancellation system is adaptable for different radio combinations. For instance, for a co-existence issue caused by a first combination of radios, a transmitting radio (e.g., WiFi) may be selected for an input of an interference cancellation (IC) circuit and a receiving radio (e.g., Bluetooth) may be selected for the output of the interference cancellation circuit. For a co-existence issue caused by a second (different) combination of radios, the transmitting radio (e.g., WiFi) may be selected for the input of the interference cancellation circuit and the receiving radio (e.g., LTE band 7) may be selected for the output of the interference cancellation circuit. It should be noted that the terms cancellation (as in interference cancellation) and variants thereof may be synonymous with reduction, mitigation, and/or the like in that at least some interference is reduced.

Interference cancellation circuits may use an analog one-tap least mean square (LMS) adaptive filter configured to match the signal in the interference cancellation path with the signal in the coupling path. An LMS adaptive filter may operate such that it mimics a desired filter using filter coefficients calculated to produce the least mean square of an error signal, which may represent the difference between a desired signal and an observed or received signal. A one-tap LMS interference cancellation filter ideally focuses its peak cancellation energy at the frequency where the power of an interfering signal is at its highest and accordingly can typically address one type of interference and/or interference affecting one frequency or band of frequencies. A DC offset may be applied to the LMS filter to actively steer the cancellation center, with the value of the DC offset being automatically calculated in the digital domain in accordance with a baseband signal derived from the receiver. The DC offset may be generated using LMS filter coefficients calculated in the digital domain in accordance with the baseband signal.

In accordance with certain aspects of the present disclosure, least mean square (LMS) filter coefficient (i.e., unknown dc bias) are determined and provided to an AIC circuit for interference cancellation by minimizing the cost function, that is, minimizing the cancellation error.

Figure 2:
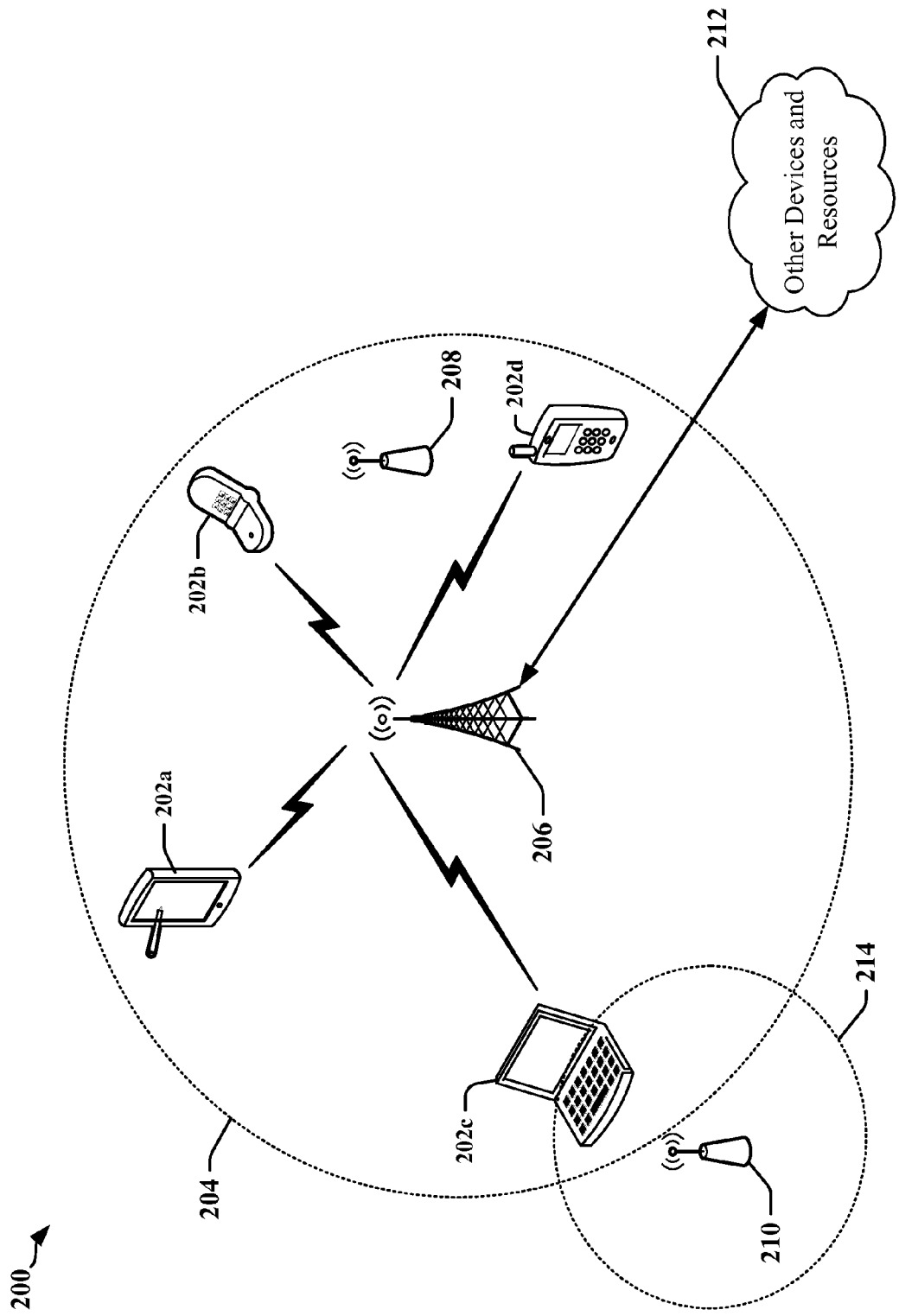
FIG. 2 is a diagram illustrating a networking environment that includes one or more wireless communication devices.

FIG. 2 is a diagram illustrating a networking environment 200 that includes one or more wireless communication devices 202a-202d. Each wireless communication device 202a-202d may be adapted or configured to transmit and/or receive wireless signals to/from at least one access point 206, 208, 210. In instances, the wireless communication device 202a-202d may be adapted or configured to transmit and/or receive wireless signals to/from at least one other wireless communication device 202a-202d. The one or more wireless communication devices 202a-202d may include a mobile device and/or a device that, while movable, is primarily intended to remain stationary. In various examples, the device may be a cellular phone, a smart phone, a personal digital assistant, a portable computing device, a wearable computing device, and appliance, a media player, a navigation device, a tablet, etc. The one or more wireless communication devices 202a-202d may also include a stationary device (e.g., a desktop computer, machine-type communication device, etc.) enabled to transmit and/or receive wireless signals. The one or more wireless communication devices 202a-202d may include an apparatus or system embodied in or constructed from one or more integrated circuits, circuit boards, and/or the like that may be operatively enabled for use in another device. Thus, as used herein, the terms "device" and "mobile device" may be used interchangeably as each term is intended to refer to any single device or any combinable group of devices that may transmit and/or receive wireless signals.

One or more of the access points 206, 208, 210 may be associated with a radio access network (RAN) 204, 214 that provides connectivity using a radio access technology (RAT). The RAN 204, 214 may connect the one or more wireless communication devices 202a-202d to a core network. In various examples, the RAN 204, 214 may include a WWAN, a WLAN, a WPAN, a wireless metropolitan area network (WMAN), a Bluetooth communication system, a WiFi communication system, a Global System for Mobile communication (GSM) system, an Evolution Data Only/Evolution Data Optimized (EVDO) communication system, an Ultra Mobile Broadband (UMB) communication system, an LTE communication system, a Mobile Satellite Service-Ancillary Terrestrial Component (MSS-ATC) communication system, and/or the like.

The RAN 204, 214 may be enabled to communicate with and/or otherwise operatively access other devices and/or resources as represented simply by cloud 212. For example, the cloud 212 may include one or more communication devices, systems, networks, or services, and/or one or more computing devices, systems, networks, or services, and/or the like or any combination thereof.

In various examples, the RAN 204, 214 may utilize any suitable multiple access and multiplexing scheme, including but not limited to Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), etc. In examples where the RAN 204, 214 is a WWAN, the network may implement one or more standardized RATs such as Digital Advanced Mobile Phone System (D-AMPS), IS-95, cdma2000, Global System for Mobile Communications (GSM), UMTS, eUTRA (LTE), or any other suitable RAT. GSM, UMTS, and eUTRA are described in documents from a consortium named "3rd Generation Partnership Project" (3GPP). IS-95 and cdma2000 are described in documents from a consortium named "3rd Generation Partnership Project 2" (3GPP2). 3GPP and 3GPP2 documents are publicly available. In examples where the RAN 204, 214 is a WLAN, the network may be an IEEE 802.11x network, or any other suitable network type. In examples where the RAN 204, 214 is a WPAN, the network may be a Bluetooth network, an IEEE 802.15x, or any other suitable network type.

A wireless communication device 202a-202d may include at least one radio (also referred to as a transceiver). The terms "radio" or "transceiver" as used herein refers to any circuitry and/or the like that may be enabled to receive wireless signals and/or transmit wireless signals. In particular aspects, two or more radios may be enabled to share a portion of circuitry and/or the like (e.g., a processing unit, memory, etc.). That is the terms "radio" or "transceiver" may be interpreted to include devices that have the capability to both transmit and receive signals, including devices having separate transmitters and receivers, devices having combined circuitry for transmitting and receiving signals, and/or the like.

In some aspects, a wireless communication device 202a-202d may include a first radio enabled to receive and/or transmit wireless signals associated with at least a first network of a RAN 204, 214 and a second radio that is enabled to receive and/or transmit wireless signals associated with an access point 206, 208, 210, a peer device or other transmitter that may geographically overlap or be collocated with the RAN 204, 214, and/or a navigation system 206 (e.g., a satellite positioning system and/or the like).

Figure 3:
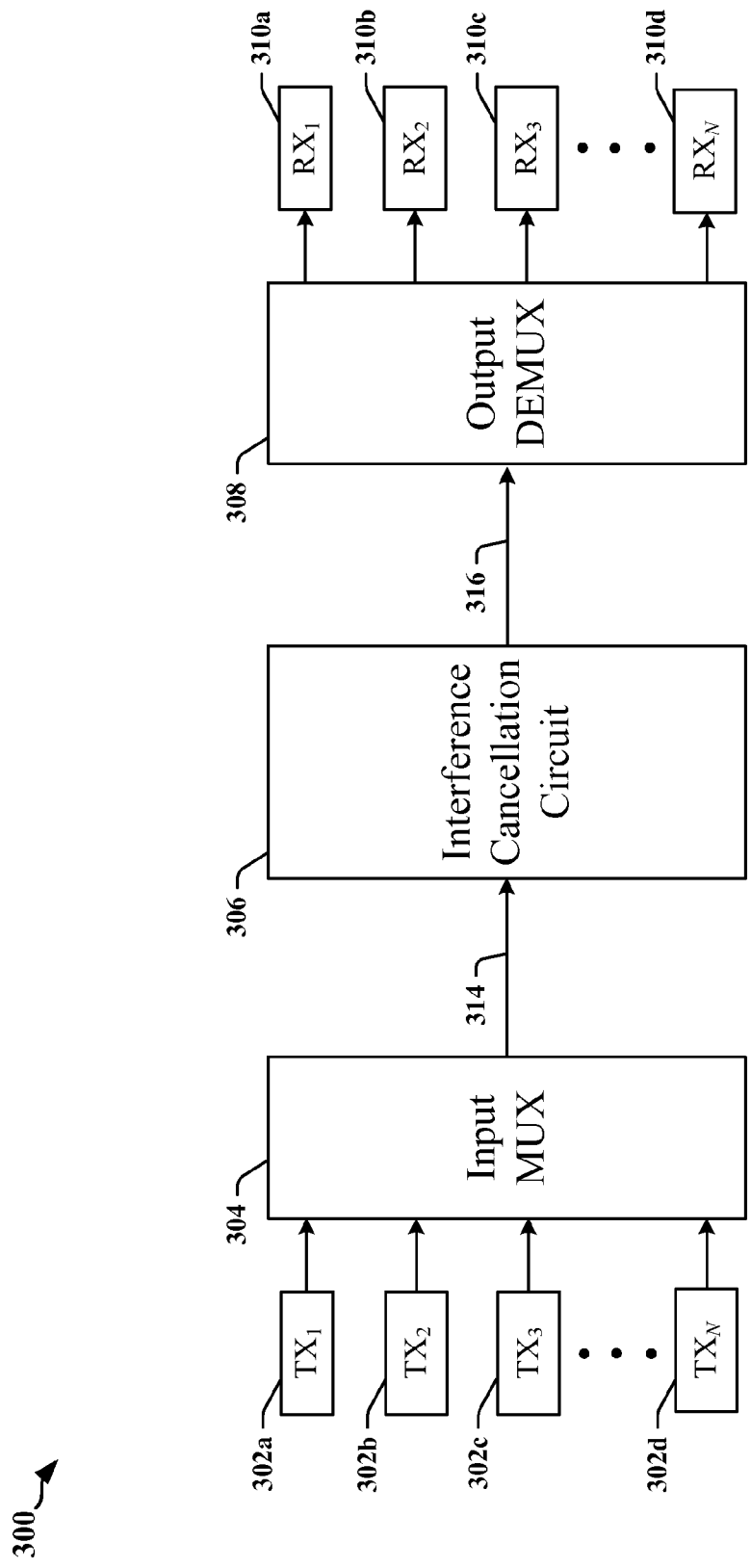
FIG. 3 is a block diagram illustrating a wireless communication device having plural transmitters and plural receivers, according to various embodiments of the disclosure.

FIG. 3 is a block diagram illustrating a wireless communication device 300 that includes a plurality of transmitters 302a-302d and a plurality of receivers 310a-310d, in accordance with certain aspects disclosed herein. The transmitters 302a-302d and receivers 310a-310d may be provided as N receiver/transmitter (Rx/Tx) circuits, including a first Rx/Tx circuit 310a/302a, a second Rx/Tx circuit 310b/302b, a third Rx/Tx circuit 310c/302c, and an Nth Rx/Tx circuit 310d/302d. Coexistence issues may occur when one or more transmitters 302a-302d are actively transmitting, and one or more receivers 310a-310d are actively receiving.

Each of the Rx/Tx circuits 310a/302a, 310b/302b, 310c/302c, and/or 310d/302d may be configured to operate according to certain parameters including, for example, a respective frequency, radio frequency circuits with group delays, coupling channel gains to other Tx/Rx circuits Rx/Tx circuits 310a/302a, 310b/302b, 310c/302c, 310d/302d, and/or the like. For instance, the first Tx/Rx circuit 310a/302a may operate at a first frequency $f_1$ with a first delay $d_1$, the second Tx/Rx circuit 310b/302b may operate at a second frequency $f_2$ with a second delay $d_2$, the third Tx/Rx circuit 310c/302c may operate at a third frequency $f_3$ with a third delay $d_3$, and the N-th Tx/Rx circuit 310d/302d may operate at an N-th frequency $f_N$ with an N-th delay $d_N$. The first Tx/Rx circuit 310a/302a may have a coupling channel gain $h_{12}$ to the second Tx/Rx circuit 310b/302b, a coupling channel gain $h_{13}$ to the third Tx/Rx circuit 310c/302c, and a coupling channel gain $h_{1N}$ to the N-th Tx/Rx circuit 310d/302d, respectively. Other Tx/Rx circuits 310a/302a, 310b/302b, 310c/302c, 310d/302d may have different coupling channel gains to various Tx/Rx circuit 310a/302a, 310b/302b, 310c/302c, 310d/302d.

In various aspects, the apparatus 300 is configured to reduce interference produced among Tx/Rx circuits 310a/302a, 310b/302b, 310c/302c, 310d/302d operating, for example, on the same, adjacent, harmonic, or sub-harmonic frequencies. An apparatus 300 may be configured or adapted for different Tx/Rx circuit combinations. That is, the apparatus 300 may be configured to cancel interference based on a co-existence issue caused by current combination of Tx/Rx circuits 310a/302a, 310b/302b, 310c/302c, and/or 310d/302d. For example, a co-existence issue at a time $T_1$ may be caused when the first transmitter 302a is employed for WiFi and the second receiver 310b is employed for Bluetooth. In conventional systems, the apparatus may be configured to selectively provide the output of the first transmitter 302a to an interference cancelling (IC) circuit 306, which may then provide an interference cancellation signal 316 to the second receiver 310b. Accordingly, the interference cancellation circuit 306, interference caused by the aggressor Tx/Rx circuit 310a/302a upon the victim Tx/Rx circuit 310b/302b can be reduced. In various examples, the coupling channel gain from the aggressor 310a/302a to the victim Tx/Rx circuit 310b/302b may be −10 dB based on separation of two antennas, and the interference cancellation circuit 306 may be configured to match this gain for successful interference cancellation. In operation aspects, the apparatus 300 may include a multiplexer (MUX) circuit 304 and a demultiplexer (DEMUX) circuit 308 that may be controlled to select an interference cancellation configuration.

Figure 4:
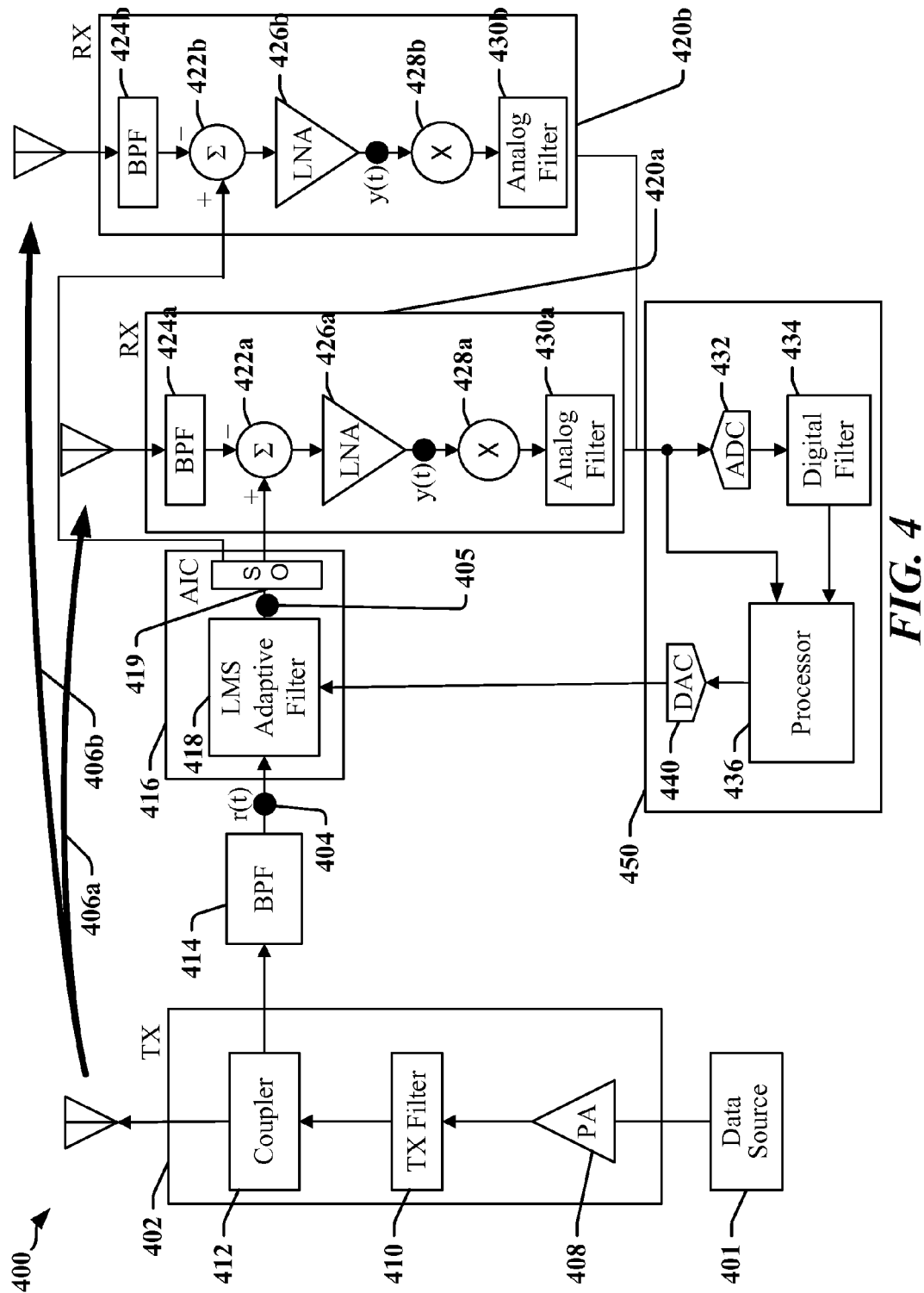
FIG. 4 is a block diagram illustrating an exemplary first system for cancelling local interference between a transmitter and two receivers.

FIG. 4 is a block diagram illustrating an exemplary first system 400 for cancelling local interference between a transmitter 402 and two receivers 420a, 420b in accordance with certain aspects disclosed herein. In various examples, FIG. 4 depicts a single input multiple output (SIMO) case. The system 400 may be associated with one or more subsystems, apparatus, devices, or components. The transmitter (TX) 402 may be an offending transmitter and the receivers 420, 420b may be victim receivers. That is, the transmitter 402 may be an offender that generates or causes local interference in connection with over-the-air interference signals 406a, 406b received by the victim receivers 420a, 420b. The offending transmitter 402 and victim receivers 420a, 420b may be part of the same device. Moreover, while a single transmitter 402 and two receivers 420a, 420b are shown, more than one transmitter 402 and/or more than two receiver 420 may be provided in accordance with aspects of the disclosure. In various aspects, the transmitter 402 is one of the transmitters 302 shown in FIG. 3 and the receivers 420a, 420b are two of the receivers 310 shown in FIG. 3.

The transmitter 402 may be associated with, or coupled to, a power amplifier (PA) 408 and a TX filter 410, which components are well-known in the art and so a further description is omitted for the sake of brevity. The PA 408 may receive a signal or data from a data source 401 for transmission by the TX 402.

The transmitter 402 may be associated with a coupler 412. The coupler 412 may be used to provide a reference signal r(t) 404 (through a BPF 414) to an AIC circuit 416. In this respect, the path from the coupler 412, through the BPF 414, to the AIC circuit 416 may serve as a reference path in order to provide the reference signal r(t). The AIC circuit 416 may include a LMS adaptive filter 418 to adaptively modify the frequency response of the reference signal r(t) 404 to match the undesired transmit interference. The reference signal r(t) 404 may correspond to some portion or function of the signal transmitted by the transmitter 402, and may be provided through a bandpass filter (BPF) 414. In various examples, the AIC circuit 416 may include a one-tap least mean square (LMS) adaptive filter, for example, to filter the reference signal r(t) 404.

Broadly, the AIC circuit 416 may be configured to generate an output signal that matches the over-the-air interference signals 406a, 406b as closely as possible, such that the AIC output can be combined with the over-the-air interference signals 406a, 406b in a destructive fashion to cancel the local interference to the receivers 420a, 420b. The local interference may be the undesired transmit interference coming from the transmitter; that is, the over-the-air interference signals 406a and 406b. The AIC 416 may include a switch operation (SO) 419. The switch operation 419 may selectively direct the filtered reference signal 405 from the AIC circuit 416 to receiver 420a, to receiver 420b, or to receivers 420a and 420b simultaneously.

The AIC circuit 416 may be configured to generate an output that can be supplied as a first input to an adder 422a of receiver (RX) 420a and/or to an adder 422b of receiver (RX) 420b. Although component 422 is depicted as an adder in FIG. 4, one skilled in the art would understand that the component 422 may be a combiner, an integrator or another component that combines or adds signals. A second input to the adder 422a may correspond to the over-the-air interference signal 406a received by the RX 420a. In some instances, the over-the-air interference signal 406a may be provided to the adder 422a through a BPF 424a. Similarly, a second input to the adder 422b may correspond to the over-the-air interference signal 406b received by the RX 420b. In some instances, the over-the-air interference signal 406b may be provided to the adder 422ab through a BPF 424b. The adder 422 may be configured to combine its inputs in order to generate an output that is provided to a low-noise amplifier (LNA) 426. In the case of RX 420a, the adder 422a output is provided to LNA 426a. And, in the case of RX 420b, the adder 422b output is provided to LNA 426b.

In various examples, the adder 422 may be configured to subtract the input provided by the AIC circuit 416 from the input received from the BPF 424. In an ideal case where selection of LMS filter coefficients is perfect, the signal provided at the input of the adder 422 is equal to the interference associated with the over-the-air interference signal 406, such that the interference is removed in the signal provided to the LNA 426.

The system 400 may provide for the BPF 414 in the reference signal path and the BPF 424 coupled to the receiver antenna to have the same filter characteristics within a specified tolerance. That is, filtering both signals in the same way can help ensure that any timing mismatch between the reference signal r(t) and the over-the-air interference signal 406 (i.e., a received signal to the receiver) is reduced or eliminated.

In some instances, the AIC circuit 416 may be configured using information that is based on the over-the-air interference signal 406 after it is converted into a baseband signal. In various examples, a coefficient controller 450 may derive one or more coefficients from a baseband signal and configure the AIC circuit 416 based on the coefficients. That is, the output y(t) from the LNA 426 may be provided to a mixer 428 and to the AIC circuit 416. The mixer 428 then converts the output y(t) from the LNA 426 from a first signal domain or frequency to a second signal domain or frequency. For example, the first signal domain may relate to a selected radio frequency and the second signal domain may relate to baseband frequencies. Here, a baseband signal may include an unmodulated signal, a lowpass signal, or a signal at relatively low frequencies, in some examples corresponding to an audible range up to 20 kHz, for example. In some instances, the mixer 428 may receive a signal from an oscillator such as a voltage-controlled oscillator (VCO) in order to provide the conversion to baseband. The output baseband signal from the mixer 428 may be provided to an analog filter 430 that may operate as an anti-aliasing filter. Although the components of a receiver are described in the generic sense, it should be understood that the descriptions presented herein are applicable to the components of each of the two receivers 420a, 420b depicted in FIG. 4. It should also be understood that the components described herein are not exclusive and that other components may be included or some of the components described may be excluded without violating the scope and spirit of the disclosure.

The output of the analog filter 430 may be provided to an analog-to-digital converter (ADC) 432 shown to reside within the coefficient controller 450. The output of the ADC 432 may optionally be provided to a digital filter 434. In various examples, (although not shown in FIG. 4) separate ADC 432 and/or digital filter 434 may be provided for each receiver 420A, 420B. The output of the digital filter 434 may be provided to a processor 436. In some instances, the digital filter 434 may be omitted such that the processor 436 may compute the digital coefficients directly from digital samples of the baseband signal output from the ADC 432.

The processor 436 may be configured to generate and output one or more signals representative of DC offset, and/or LMS coefficients to the AIC circuit 416. The processor 436 may produce an output in a digital format, and the output may be provided to a digital-to-analog converter (DAC) 440. The output of the DAC 440 may then be provided to the AIC 416 and/or the LMS adaptive filter 418. In various examples, the block diagram of FIG. 4 represents a single input multiple output (SIMO) case.

Interference cancellation circuits provided according to certain aspects disclosed herein can be adapted to simultaneously handle multiple interference sources and/or types that may affect a receiver. In various examples, a source of interference may be a nearby and/or local transmit antenna that transmits LTE signals in frequencies allocated to LTE. These LTE signals can produce strong interference at a Wi-Fi receive antenna. Different types of interference may be produced, including interference caused by out-of-band (OOB) emission, fundamental emission, and phase noise. Interference may be produced even if the frequencies used by the Wi-Fi channel are far from the frequencies used by LTE. In one specific example, interference may occur between the 2.462 GHz Wi-Fi Channel 11 and LTE transmissions in LTE band 40 (B40), which is allocated frequencies between 2.3 GHz and 2.4 GHz with a bandwidth of 100 MHz. Interference may occur because the channelization filter, which may be an analog anti-aliasing filter, is placed after a mixer, and an excessive amount of energy falls into the Wi-Fi band, and saturates RX front end. Although the examples described herein may be based on LTE signals, other wireless signal types are equally applicable to the examples herein and are intended to be covered by the disclosure.

Figure 5:
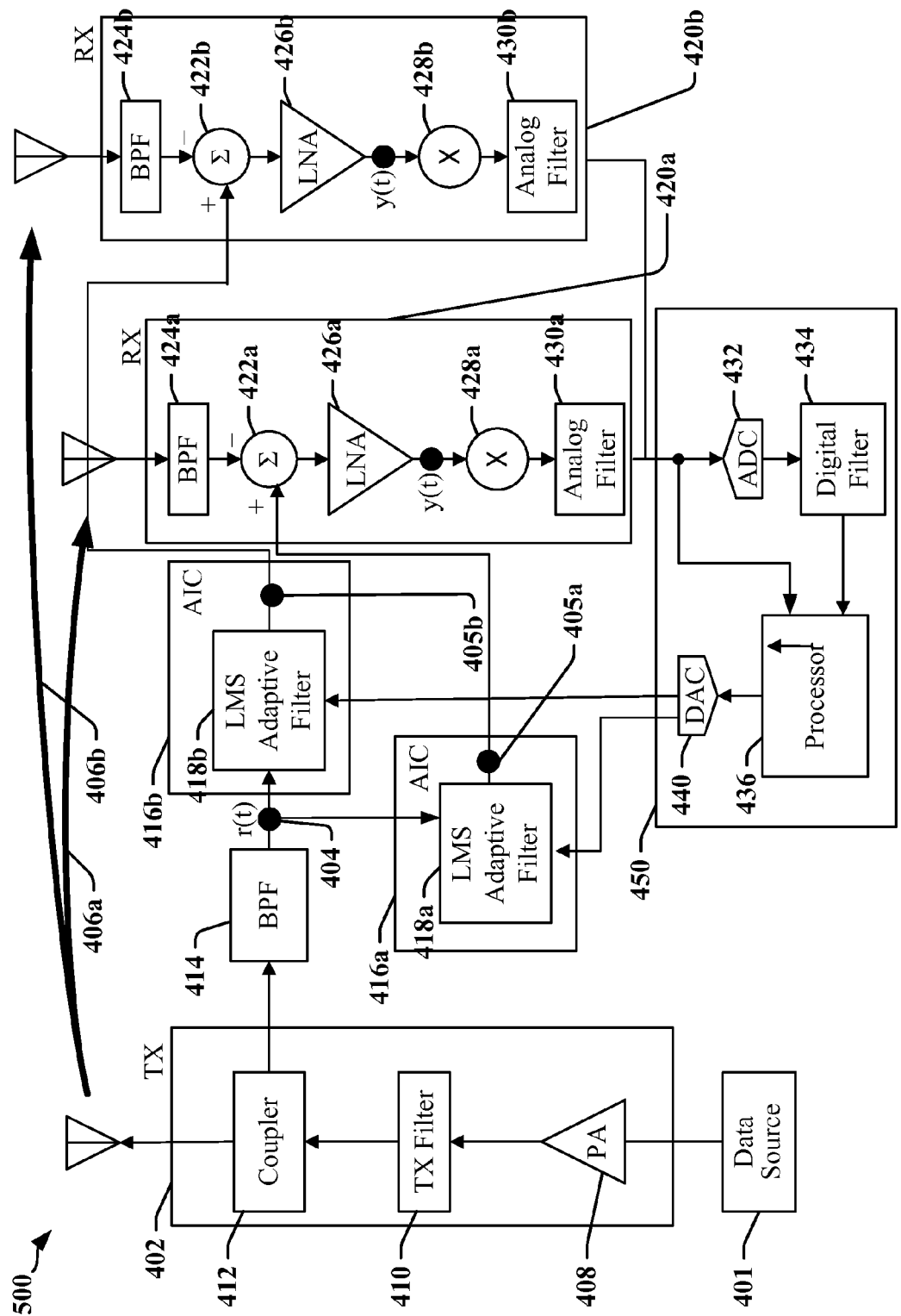
FIG. 5 is a block diagram illustrating an exemplary second system for cancelling local interference between a transmitter and two receivers.

FIG. 5 is a block diagram illustrating an exemplary second system 500 for cancelling local interference between a transmitter 402 and two receivers 420a, 420b in accordance with certain aspects disclosed herein. In various examples, FIG. 5 depicts a single input multiple output (SIMO) case similar to the system 400 depicted in FIG. 4 with at least one difference in that there are two AIC circuits 416a, 416b in system 500. The system 500 may be associated with one or more subsystems, apparatus, devices, or components. The transmitter (TX) 402 may be an offending transmitter and the receivers 420a, 420b may be victim receivers.

In system 500, the coupler 412 may be used to provide a reference signal r(t) 404 to each of the AIC circuits 416a, 416b. As shown in FIG. 5, each of the AIC circuits 416a, 416b may include a LMS adaptive filter 418a, 418b. However, in other options, only one of the AIC circuits 416a, 416b may include a LMS adaptive filter. In other examples, the AIC circuits 416a, 416b do not include LMS adaptive filters. In system 500, the coefficient controller 450 feeds its output to both the AIC circuits 415a, 416b. And, outputs from each of the analog filters 430a, 430b of the two receivers 420a, 420b are fed to the ADC 432 within the coefficient controller 450. The functions of the other components shown in FIG. 5 are the same as that described in referenced to the corresponding components shown in FIG. 4 and therefore are not repeated herein for the sake of brevity. In various examples, (although not shown in FIG. 5) separate ADC 432 and/or digital filter 434 may be provided for each receiver 420A, 420B.

One advantage of system 500 includes using a single coefficient controller 450 in association with the two AIC circuits 416a, 416b. In this configuration, there is a savings in hardware of using only a single coefficient controller. In various examples, the single coefficient controller includes a time sharing operation to serve the two receivers 420a and 420b. In various examples, the block diagram of FIG. 5 represents a single input multiple output (SIMO) case and may include more than two receivers.

Figure 6:
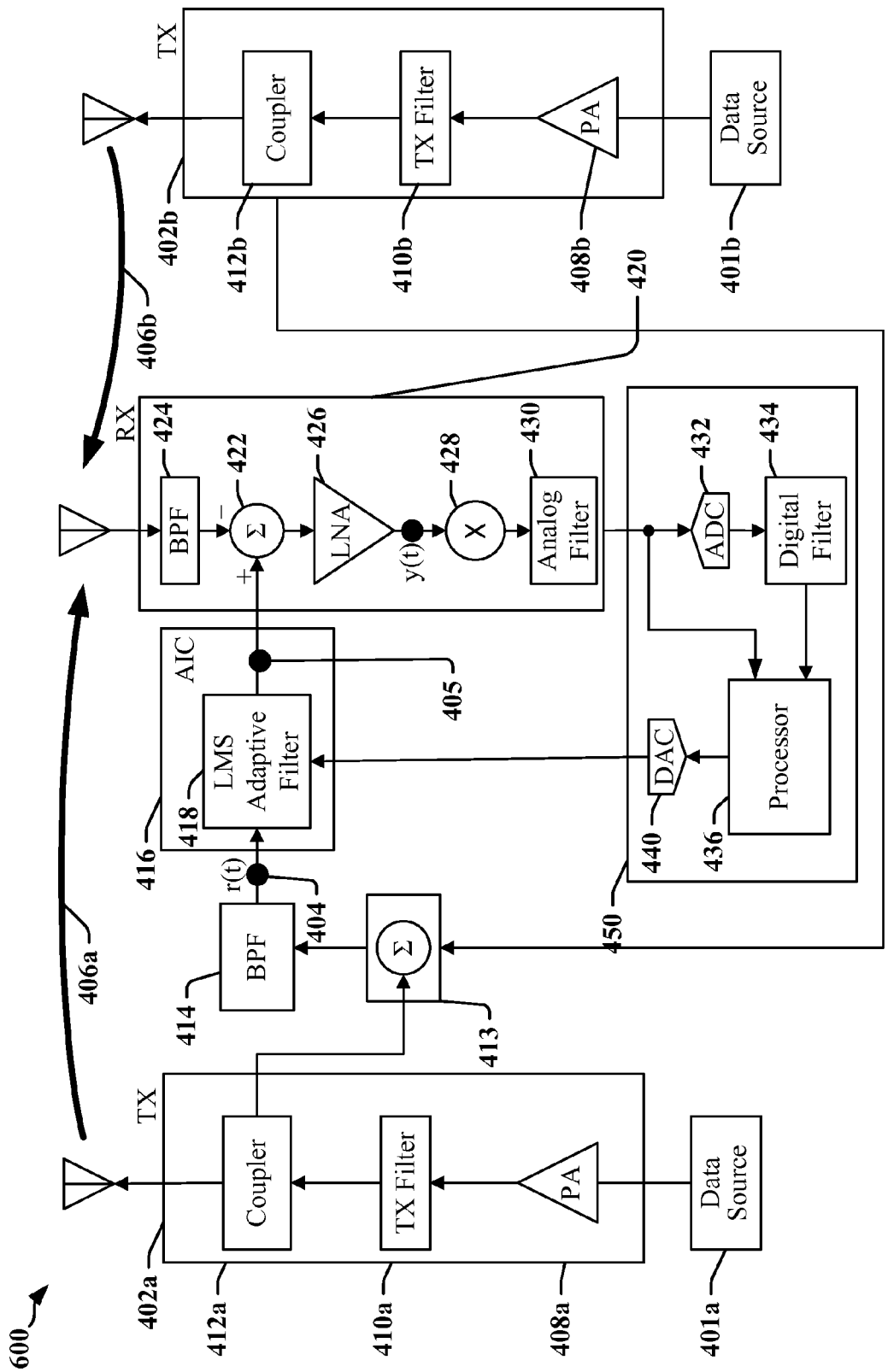
FIG. 6 is a block diagram illustrating an exemplary first system for cancelling local interference between two transmitters and one receiver.

FIG. 6 is a block diagram illustrating an exemplary first system 600 for cancelling local interference between two transmitters 402a, 402b and one receiver 420 in accordance with certain aspects disclosed herein. In various examples, FIG. 6 depicts a multiple input single output (MISO) case. The system 600 may be associated with one or more subsystems, apparatus, devices, or components. The two transmitters (TX) 402a, 402b may be offending transmitters and the receiver 420 may be a victim receiver.

FIG. 6 depicts two transmitters 402a, 402b, each with its respective data source 401a, 401b. The components of each respective transmitters are labeled as "a" and "b". Since the transmitter and receiver components are the same as those depicted in FIGS. 4 and 5, their specific functions will not be repeated herein for the sake of brevity. The two transmitters 402a, 402b each feed a reference signal to an adder 413. Although component 413 is depicted as an adder in FIG. 6, one skilled in the art would understand that the component 413 may be a combiner, an integrator, a switch or another component that combines or adds signals. In the various cases where the adder 413 is a switch, the switch may operate to time share the inputs (i.e., reference signals) from the two couplers 412a, 412b from the respective two transmitters 402a, 402b.

Each of the reference signals may correspond to some portion or function of the signal transmitted by its respective transmitter 402a, 402b, and may be provided through the adder 413 to the BPF 414. The output of the BPF 414 is a combined reference signal r(t) 404. The combined reference signal r(t) 404 is fed into the AIC circuit 416 which may be configured to generate an output signal that matches the over-the-air interference signals 406a, 406b within a given tolerance, such that the AIC output can be combined with the over-the-air interference signals 406a, 406b in a destructive fashion to cancel the local interference to the receiver 420.

The components in receiver 420 have already been described in FIG. 4, and thus, are not repeated herein for the sake of brevity. The output of the analog filter 430 is fed into the coefficient controller 450, and the output of the DAC 440 is fed to the AIC circuit 416. Since the loop from the receiver 420 through the coefficient controller 450 to the AIC circuit 416 is the same as depicted in FIG. 4, the description will not be repeated herein. In various examples, the block diagram of FIG. 6 represents a multiple input single output (MISO) case which may include more than two transmitters.

Figure 7:
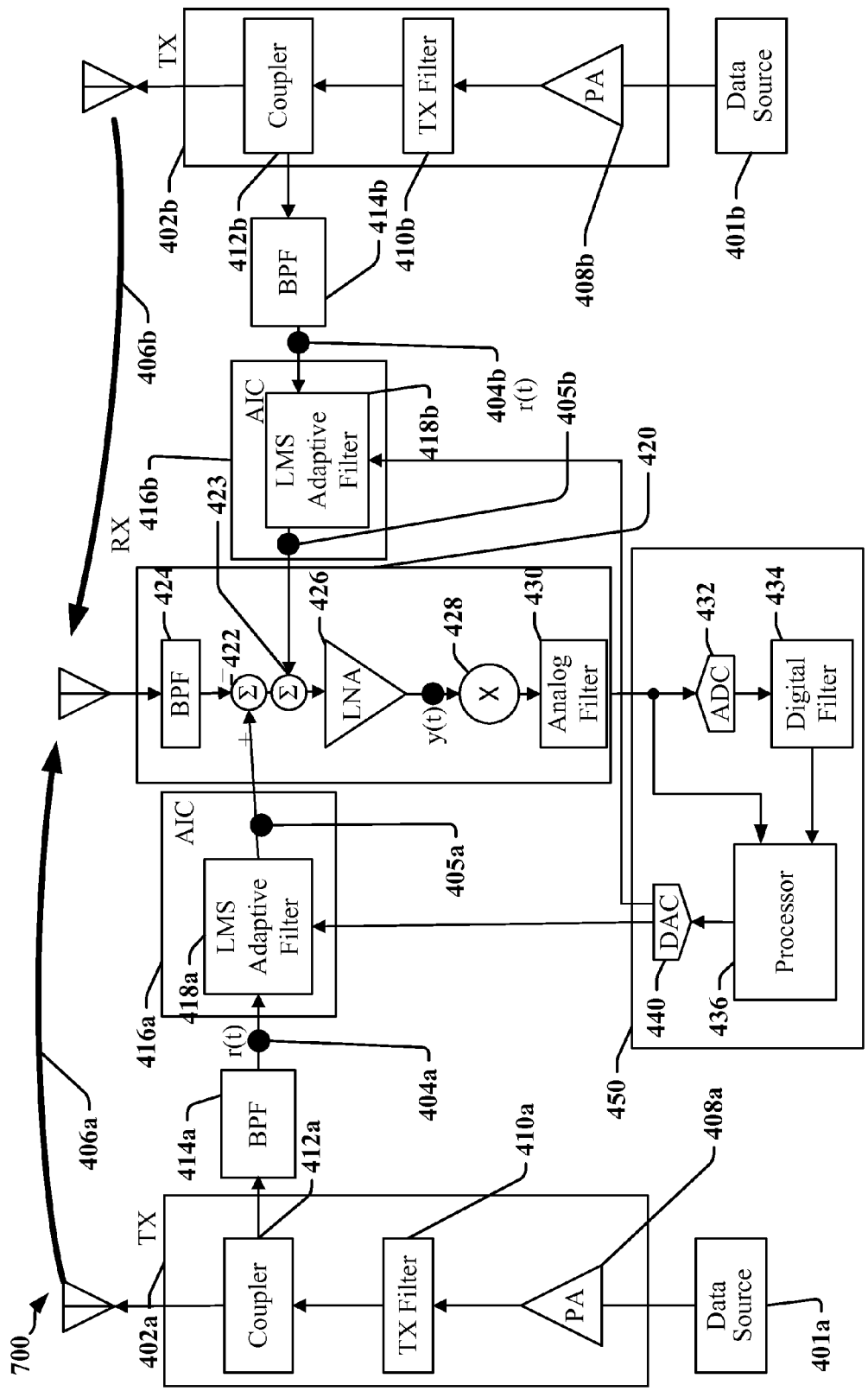
FIG. 7 is a block diagram illustrating an exemplary second system for cancelling local interference between two transmitters and one receiver.

FIG. 7 is a block diagram illustrating an exemplary second system 700 for cancelling local interference between two transmitters 402a, 402b and one receiver 420 in accordance with certain aspects disclosed herein. The components in FIG. 7 which are similar to those shown in FIG. 6 are not repeated herein for the sake of brevity. System 700 of FIG. 7 differs from system 600 of FIG. 6 in not having the adder 413. Furthermore, system 700 includes a second AIC circuit 416b to accommodate transmitter 402b. In system 700, unlike system 600, each of the transmitters 402a, 402b is associated with its own AIC circuit; that is, transmitter 402a is associated with AIC circuit 416a, and transmitter 402b is associated with AIC circuit 416b. System 700 also differs from system 600 in that the receiver 420 includes two adders: an adder 422 (also in system 600) and an additional adder 423 to accommodate the output of the second AIC circuit 416b. However, similar to system 600, system 700 includes a single coefficient controller 450 for outputting updated coefficients to the two AIC circuits 416a, 416b. In various examples, the block diagram of FIG. 6 represents a multiple input single output (MISO) case which may include more than two transmitters.

Figure 8:
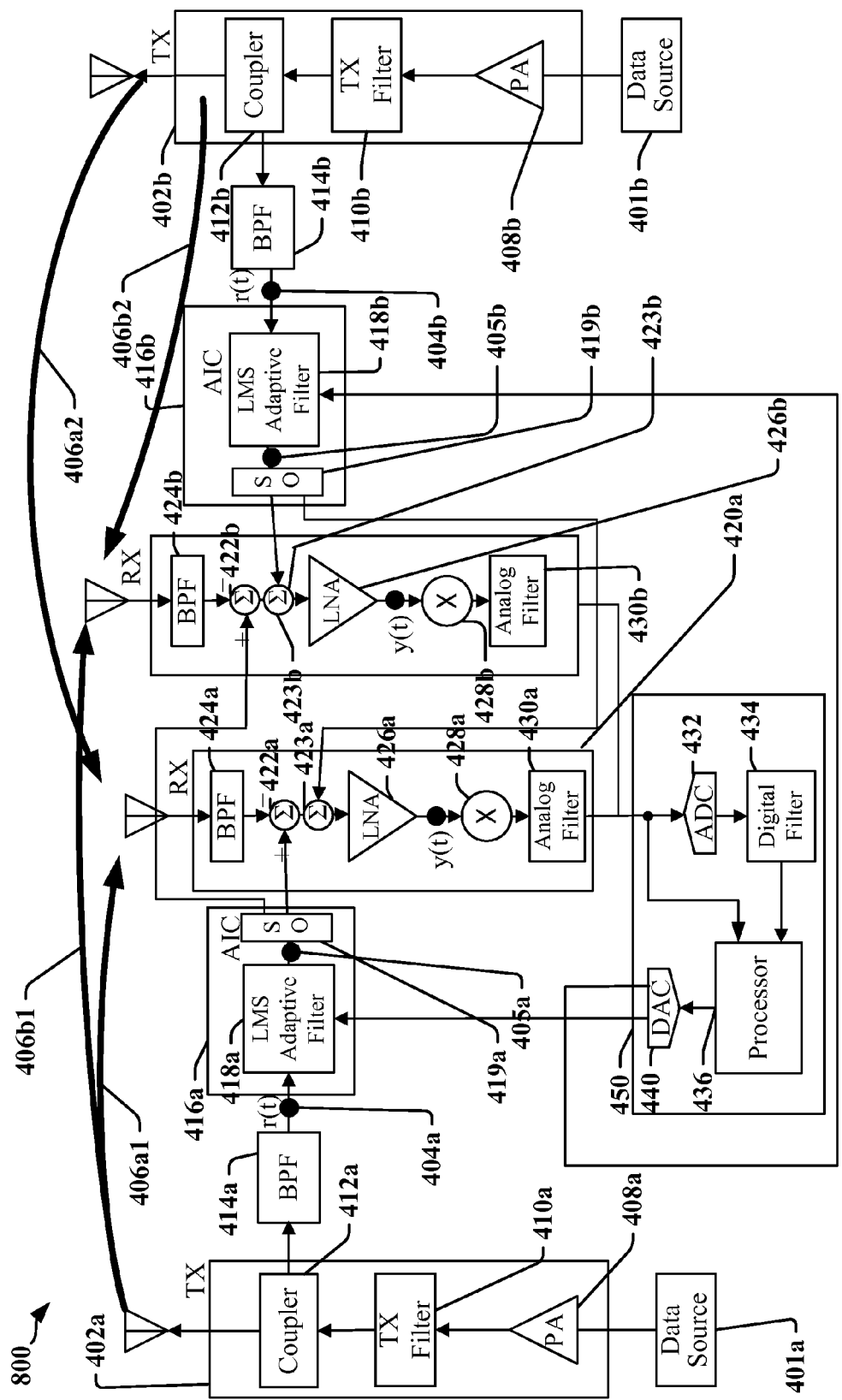
FIG. 8 is a block diagram illustrating an exemplary system for cancelling local interference between two transmitters and two receivers.

FIG. 8 is a block diagram illustrating an exemplary system for cancelling local interference between two transmitters 402a, 402b and two receivers 420a, 420b in accordance with certain aspects disclosed herein. The components in FIG. 8 which are similar to those shown in FIG. 7 are not repeated herein for the sake of brevity. System 800 of FIG. 8 differs from system 700 of FIG. 7 in including an additional receiver 420b. The components of the additional receiver 420b are the same as those of the first receiver 420a. In various examples, (although not shown in FIG. 8) separate ADC 432 and/or digital filter 434 may be provided for each receiver 420A, 420B. In various examples, the block diagram of FIG. 8 represents a multiple input multiple output (MIMO) case which may include more than two transmitters and more than two receivers.

Figure 9:
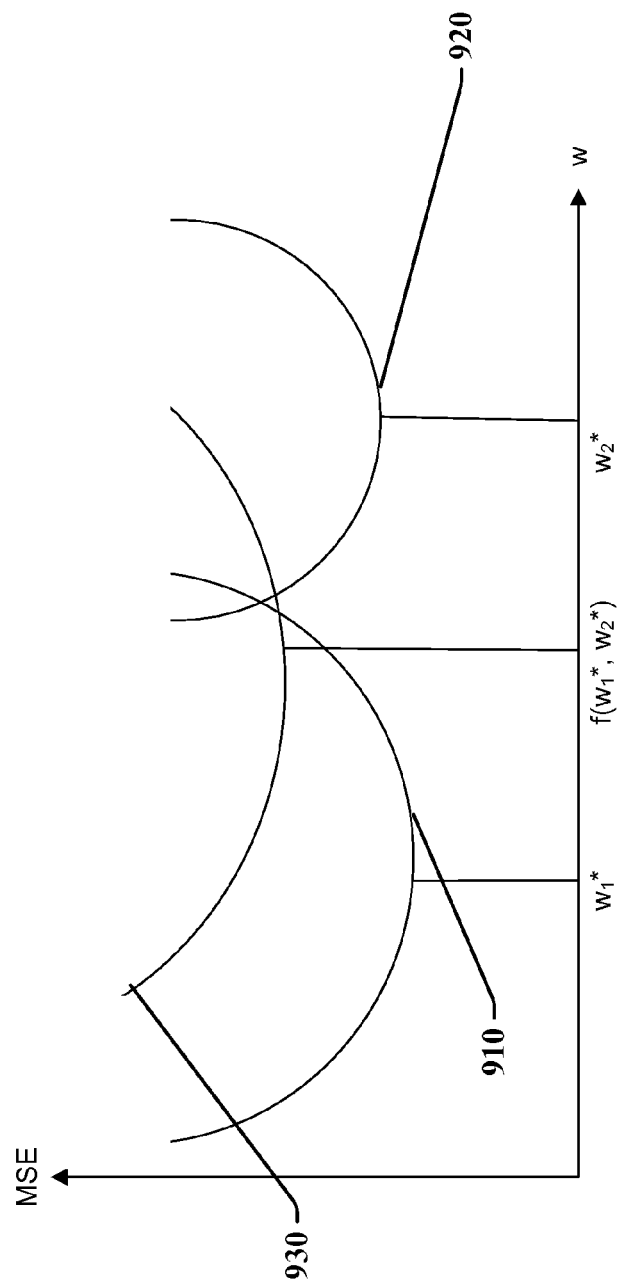
FIG. 9 illustrates exemplary mean square error (MSE) performance curves as a function of adaptive filter coefficients for different transmit interference scenarios.

FIG. 9 illustrates exemplary mean square error (MSE) performance curves as a function of adaptive filter coefficients for different transmit interference scenarios. The MSE is a performance metric which is a measure of the residual error after implementing interference cancellation. In general, a lower MSE value indicates better interference cancellation.

FIG. 9 shows three curves 910, 920, 930. The axes shown in FIG. 9 are w, a coefficient value, in the horizontal axis and mean square error (MSE) in the vertical axis. Curve 910 is a quadratic curve centered at $w=w_1^*$, where $w_1^*$ represents a first optimal coefficient for a first transmit interference scenario. In the first transmit interference scenario, it is assumed that only interference from a first transmitter enters the receive path. In this case, the first optimal coefficient $w_1^*$ yields the minimum (or near minimum) MSE performance in the first transmit interference scenario. The second curve, curve 920, is a quadratic curve centered at $w=w_2^*$, where $w_2^*$ represents a second optimal coefficient for a second transmit interference scenario. In the second transmit interference scenario, it is assumed that only interference from a second transmitter enters the receive path. In this case, the second optimal coefficient $w_2^*$ yields the minimum (or near minimum) MSE performance in the second transmit interference scenario. The first optimal coefficient may be selected to minimize the MSE for curve 910 and second optimal coefficient may be selected to minimize the MSE for curve 920.

In FIG. 9, curve 930 is a quadratic curve centered at $w=w_c^*$, where $w_c^*$ represents a composite optimal coefficient for a composite transmit interference scenario. That is, the composite transmit interference scenario assumes interference simultaneously from both the first transmitter and the second transmitter. For this scenario, the composite optimal coefficient $w_c^*$ yields the minimum (or near minimum) MSE performance in the composite transmit interference scenario. The determination of the composite optimal coefficient $w_c^*$ may be obtained as a function f of the first optimal coefficient $w_1^*$ and the second optimal coefficient $w_2^*$ via:

$$w_c^* = f(w_1^*, w_2^*) \qquad \text{eqn (1)}$$

For example, the composite optimal coefficient $w_c^*$ may be obtained as a weighted sum of the first optimal coefficient $w_1^*$ and the second optimal coefficient $w_2^*$:

$$w_c^* = a_1 w_1^* + a_2 w_2^*, \qquad \text{eqn (2)}$$

where $a_1$, $a_2$ are weights applied respectively to $w_1^*$ and $w_2^*$. In various examples, the weights $a_1$, $a_2$ may be predetermined based on the system and/or application.

The relationship between the first and second optimal coefficients and the composite optimal coefficient relies on a mathematical property that yields the sum of two quadratic functions as a quadratic function. For example, let $x_1$ represent a first transmit signal from the first transmitter and let $x_2$ represent a second transmit signal from the second transmitter. Let $r_1$ represent a first reference signal from the first transmitter and let $r_2$ represent a second reference signal from the second transmitter. Let $h_1$ represent a first channel gain from the first transmitter and let $h_2$ represent a second channel gain from the second transmitter. Let $w_1$ represent a first coefficient for a first AIC circuit and let $w_2$ represent a second coefficient for a second AIC circuit. The determination of a composite optimal coefficient $w_c^*$ for interference cancellation may be expressed as the following:

find coefficients $w_1$ and $w_2$ which jointly minimize the MSE $$\text{where } MSE = E[(h_1 x_1 - w_1 r_1) + (h_2 x_2 - w_2 r_2)]^2 = \qquad \text{eqn (3)}$$
$$E[(h_1 x_1 - w_1 r_1)^2] + E[(h_2 x_2 - w_2 r_2)^2] +$$
$$2Re\{E[(h_1 x_1 - w_1 r_1)'(h_2 x_2 - w_2 r_2)]\}$$

where E[ ] is an expected value operator.

If $h_1$ & $h_2$, $x_1$ & $x_2$, and $r_1$ & $r_2$ are all independent, then the independent minima of $(h_1 x_1 - w_1 r_1)^2$ and $(h_2 x_2 - w_2 r_1)^2$ yield the composite minimum of the MSE. For example, if the $h_1$ and $h_2$ are strongly correlated or statistically similar, then a composite coefficient $w_c$ may be determined from the first optimal coefficient $w_1^*$ and the second optimal coefficient $w_2^*$ which minimizes the mean square error (MSE). In various examples, the composite optimal coefficient $w_c^*$ is or may be derived from the composite coefficient $w_c$. The composite optimal coefficient $w_c^*$ is the coefficient which minimizes curve 930. Even if $h_1$ and $h_2$ are independent, the MSE curve may still be quadratic and the composite optimal coefficient $w_c^*$ may be found and may be between $w_1^*$ and $w_2^*$.

Figure 10:
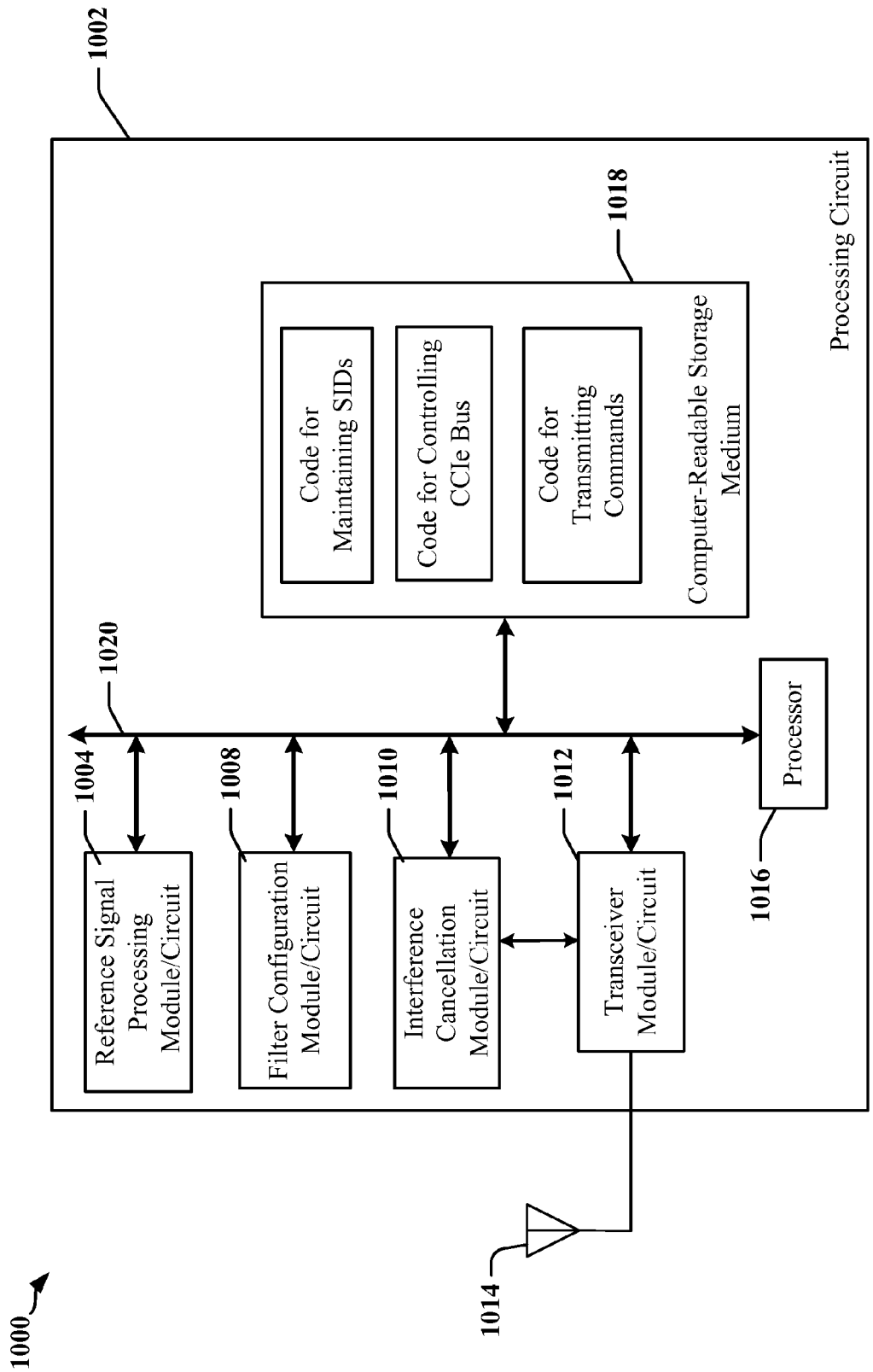
FIG. 10 is a diagram illustrating an example of a hardware implementation for an apparatus employing a processing employing a processing circuit adapted according to certain aspects disclosed herein.

FIG. 10 is a diagram illustrating a simplified example of a hardware implementation for an apparatus 1000 employing a processing circuit 1002. The processing circuit typically has a processor 1016 that may include one or more of a microprocessor, microcontroller, digital signal processor, a sequencer and a state machine. The processing circuit 1002 may be implemented with a bus architecture, represented generally by the bus 1020. The bus 1020 may include any number of interconnecting buses and bridges depending on the specific application of the processing circuit 1002 and the overall design constraints. The bus 1020 links together various circuits including one or more processors and/or hardware modules, represented by the processor 1016, the modules or circuits 1004 and 1008, transceiver circuits 1012 configurable to communicate over the one or more antennas 1014 and the computer-readable storage medium 1018. The bus 1020 may also link various other circuits such as timing sources, peripherals, voltage regulators, and power management circuits, which are well known in the art, and therefore, will not be described any further.

The processor 1016 is responsible for general processing, including the execution of software stored on the computer-readable storage medium 1016. The software, when executed by the processor 1016, causes the processing circuit 1002 to perform the various functions described supra for any particular apparatus. The computer-readable storage medium 1018 may also be used for storing data that is manipulated by the processor 1016 when executing software, including data transmitted or received in RF signals transmitted over the one or more antennas 1014, which may be configured as data lanes and clock lanes. The processing circuit 1002 further includes at least one of the modules 1004 and 1008. The modules 1004 and 1008 may be software modules running in the processor 1016, resident/stored in the computer-readable storage medium 1018, one or more hardware modules coupled to the processor 1016, or some combination thereof. The modules 1004 and/or 1008 may include microcontroller instructions, state machine configuration parameters, or some combination thereof.

In one configuration, the apparatus 1000 for wireless communication includes a module and/or circuit 1004 that is configured to receive and process a reference signal representative of an interfering signal transmitted by apparatus 1000, a module and/or circuit 1008 configured to configure a filter using RF, baseband or digital feedback, and a module and/or circuit 1010 configured to cancel interference in the RF signal. Although it is shown in FIG. 10 that the modules/circuits (e.g., 1004, 1008, 1010, 1012, 1018) are external to processor 1016, one would understand that one or more of these modules/circuits may reside within the processor 1016.

Figure 11:
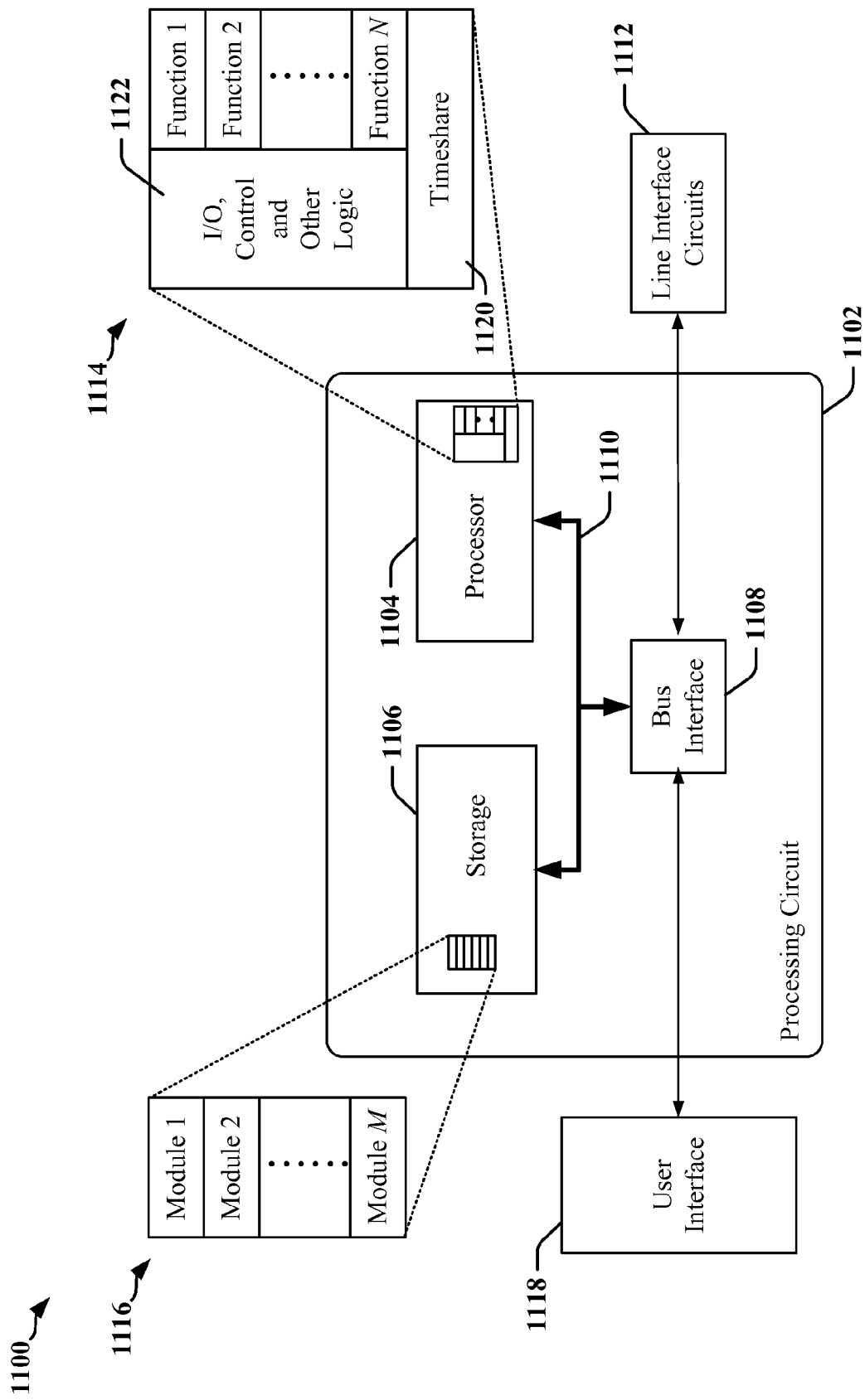
FIG. 11 is a block diagram illustrating an example of an apparatus employing a processing circuit that may be adapted according to certain aspects disclosed herein.

FIG. 11 is a conceptual diagram 1100 illustrating a simplified example of a hardware implementation for an apparatus employing a processing circuit 1102 that may be configured to perform one or more functions disclosed herein. In accordance with various aspects of the disclosure, an element, or any portion of an element, or any combination of elements as disclosed herein may be implemented using the processing circuit 1102. The processing circuit 1102 may include one or more processors 1104 that are controlled by some combination of hardware and software modules. Examples of processors 1104 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices, and may be referred to herein as computer-readable storage media and/or processor-readable storage media. The bus 1110 may also link various other circuits such as timing sources, timers, peripherals, voltage regulators, and power management circuits. A bus interface 1108 may provide an interface between the bus 1110 and one or more transceivers 1112. A transceiver 1112 may be provided for each networking technology supported by the processing circuit. In some instances, multiple networking technologies may share some or all of the circuitry or processing modules found in a transceiver 1112. Each transceiver 1112 provides a means for communicating with various other apparatus over a transmission medium. Depending upon the nature of the apparatus, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable storage medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement any one of the methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer-readable storage medium. The external computer-readable storage medium and/or storage 1106 may include a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium and/or storage 1106 may also include, by way of example, a carrier wave, a transmission line, and any other suitable medium for transmitting software and/or instructions that may be accessed and read by a computer. Computer-readable storage medium and/or the storage 1106 may reside in the processing circuit 1102, in the processor 1104, external to the processing circuit 1102, or be distributed across multiple entities including the processing circuit 1102. The computer-readable storage medium and/or storage 1106 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as the transceiver 1112, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to the transceiver 1112, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the transceiver 1112, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Figure 12:
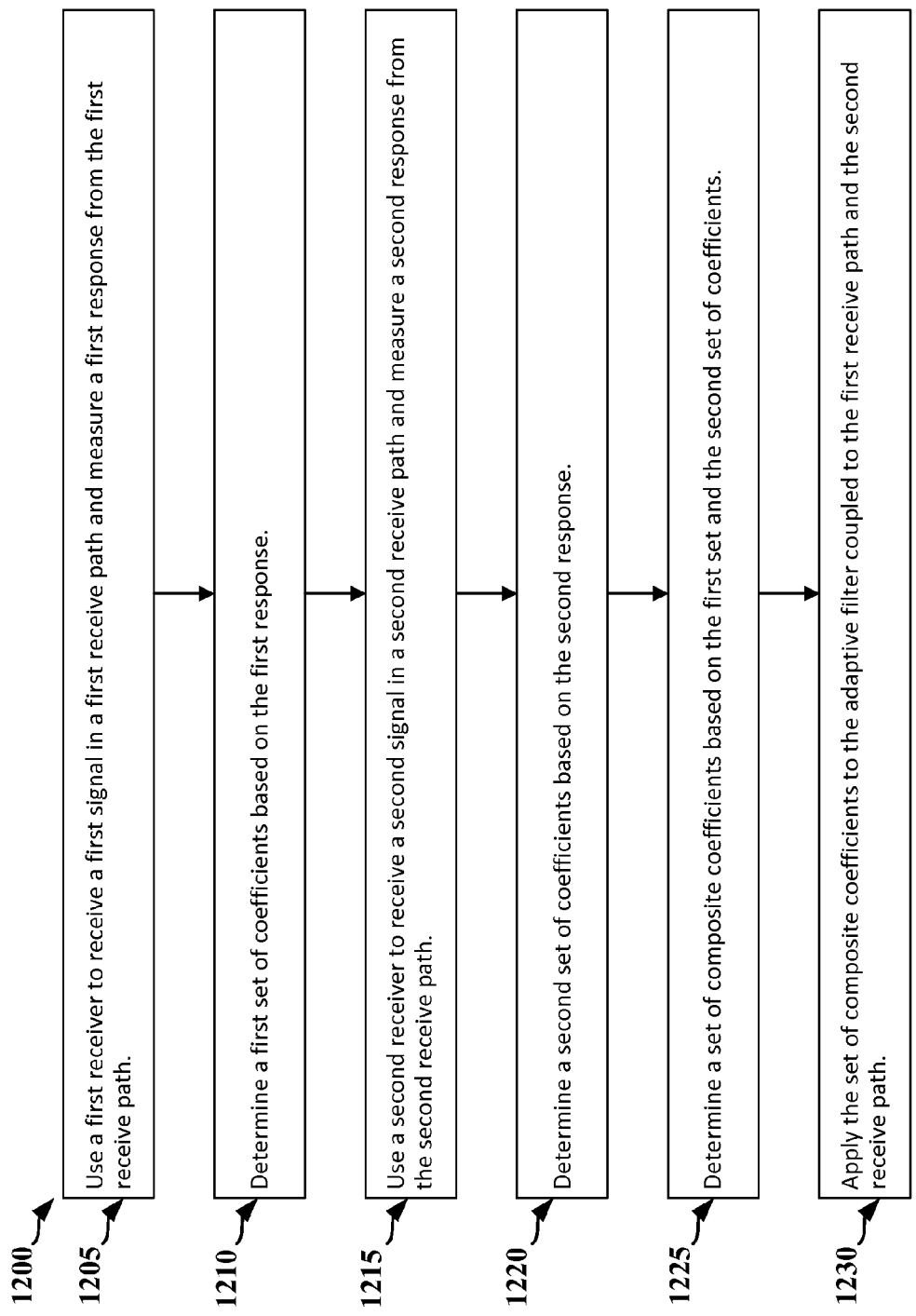
FIG. 12 is a flow diagram illustrating a first example of interference cancellation with multiple antennas.

FIG. 12 is a flow diagram illustrating a first example of interference cancellation with multiple antennas. In FIG. 12, composite coefficients are applied for transmit interference mitigation in the case of a single transmitter and multiple receivers, for example, two receivers. In various examples, the flow diagram of FIG. 12 applies to a single input multiple output (SIMO) case.

The method may also be performed by a device having one or more transmitters and one or more receivers. In various examples, the one or more transmitters and receivers both operate in accordance with the same radio access technology (RAT). In another example, the device is configured to transmit signals in accordance with a first RAT while receiving signals transmitted in accordance with a second RAT. Additionally, the components described in FIGS. 10 and 11 may be implemented to perform some or all the blocks of the flow diagram in FIG. 12.

In block 1205, use a first receiver to receive a first signal in a first receive path and measure a first response from the first receive path. The first response may include a desired signal, an interference signal and/or thermal noise. A coefficient controller 450 may be used to measure the first response from the first receive path. The interference signal and/or thermal noise are undesirable. In various examples, the first response is measured at the output of the first receiver. In various examples, the first receive path is enabled and the second receive path is disabled when measuring the first response. A switch (or an equivalent component) may be used to enable and disable the different receive paths. The first response may be measured from a first analog-to-digital converter with N bits of precision and a sample rate R. The quantities of "N" and "R" may be any quantities appropriate for the application and/or system as determined by the user and/or system designer. The first analog-to-digital converter may be implemented as a first pair of parallel analog-to-digital converters for in-phase and quadrature responses. The first response may be measured as a sample average, where M response samples are averaged to produce the first response. The quantity of "M" may also depend on the application and/or system. The first response may be measured as a moving average, where the first response is produced from a weighted moving average of consecutive response samples.

In block 1210, determine a first set of coefficients based on the first response. In various examples, the first set of coefficients when applied to the AIC circuit 416 would provide a filtered reference signal 405 that minimizes a cost function associated with the first response. Minimizing the cost function may be implemented, for example, by using a least mean square (LMS) error criterion on the first response. For example, the desire is to determine a first set of coefficients that would minimize a first quadratic error function associated with the first response. The determination of the first set of coefficients may be performed by a coefficient controller 450. Known algorithms may be used by the coefficient controller for determining coefficients to apply in the AIC circuit for interference cancellation. Thus, specific algorithms to be used by the coefficient controller will not be discussed herein.

In block 1215, use a second receiver to receive a second signal in a second receive path and measure a second response from the second receive path. A coefficient controller 450 may be used to measure the second response from the second receive path. The second response may include a desired signal, an interference signal and/or thermal noise. The interference signal and/or thermal noise are undesirable. In various examples, the second response is measured at the output of the second receiver. In various examples, the first receive path and the second receive path are connected to two different receive antennas. The enabling of the second receive path may be implemented by the use of a switch. In various examples, the second receive path is enabled and the first receive path is disabled when measuring the second response. A switch (or an equivalent component) may be used to enable and disable the different receive paths.

The second response may be measured from a second analog-to-digital converter with N bits of precision and a sample rate R. The quantities of "N" and "R" may be any quantities appropriate for the application and/or system as determined by the user and/or system designer. The second analog-to-digital converter may be implemented as a second pair of parallel analog-to-digital converters for in-phase and quadrature responses. The second response may be measured as a sample average, where M response samples are averaged to produce the second response. The quantity of "M" may also depend on the application and/or system. The second response may be measured as a moving average, where the second response is produced from a weighted moving average of consecutive response samples.

In block 1220, determine a second set of coefficients based on the second response. In various examples, the second set of coefficients when applied to the AIC circuit 416 would provide a filtered reference signal 405 that minimizes a cost function associated with the second response. Minimizing the cost function may be implemented, for example, by using a least mean square (LMS) error criterion on the second response. For example, the desire is to determine a second set of coefficients that would minimize a second quadratic error function associated with the second response. The determination of the second set of coefficients may be performed by the coefficient controller 450. The coefficient controller used for determining the first set of coefficients and the coefficient controller for determining the second set of coefficients may be the same coefficient controller or may be two different coefficient controllers.

In block 1225, determine a set of composite coefficients based on the first set and the second set of coefficients. A weighted sum of the first set of coefficients and the second set of coefficients may be used for determining the set of composite coefficients. Weighting criteria may depend on the system and thus may be a default formula preset by the system designer or selected by the user at the time of the interference cancellation. In various examples, a coefficient controller 450 is used for determining the set of composite coefficients. The coefficient controller is shared among the first and second receive paths. That is, although there are two receivers, only one coefficient controller is used to determine the coefficients to be inputted to an adaptive filter that is coupled to the receivers. The adaptive filter may be a single tap least mean square (LMS) filter.

The coefficient controller determines the set of composite coefficients by minimizing a composite quadratic error function, wherein the composite quadratic error function is a superposition of the first and second quadratic error functions. In various examples, the same adaptive filter is coupled to the first and second receive paths. In various examples, the adaptive filter may instead be a first adaptive filter and a second adaptive filter with the first adaptive filter coupled to the first receive path and the second adaptive filter coupled to the second receive path. In other examples, the first receive path is coupled to a first adaptive filter (e.g. residing within a first AIC circuit) and the second receive path is coupled to a second adaptive filter (e.g. residing within a second AIC circuit). However, in the various examples where two adaptive filters are used, one coefficient controller may be shared (i.e., a shared coefficient controller). In various examples, the shared coefficient controller is time-shared between the two receivers. And, a switching operation may be used to implement the time sharing. In various examples, the shared coefficient controller uses a least mean square (LMS) error criterion.

In block 1230, apply the set of composite coefficients to the adaptive filter coupled to the first receive path and the second receive path. In various examples, the AIC circuit applies the set of composite coefficients to the adaptive filter.

FIG. 13 is a flow diagram illustrating a second example of interference cancellation with multiple antennas. In FIG. 13, composite coefficients are applied for transmit interference mitigation in the case of multiple transmitters (for example, two transmitters) and a single receiver. In various examples, the flow diagram of FIG. 13 applies to a multiple input single output (MISO) case which may include more than two transmitters.

The method may also be performed by a device having one or more transmitters and one or more receivers. In various examples, the one or more transmitters and receivers both operate in accordance with the same radio access technology (RAT). In another example, the device is configured to transmit signals in accordance with a first RAT while receiving signals transmitted in accordance with a second RAT. Additionally, the components described in FIGS. 10 and 11 may be implemented to perform some or all the blocks of the flow diagram in FIG. 13.

In block 1305, enable a first transmit path and disable a second transmit path to measure a first response. The first response may include a desired signal, an interference signal and/or thermal noise. The interference signal and/or thermal noise are undesirable. In various examples, the first response is measured at the output of the receiver. In various examples, the first transmit path is enabled and the second transmit path is disabled when measuring the first response. A switch (or an equivalent component) may be used to enable and disable the different transmit paths. The first response may be measured from a first analog-to-digital converter with N bits of precision and a sample rate R. The quantities of "N" and "R" may be any quantities appropriate for the application and/or system as determined by the user and/or system designer. The first analog-to-digital converter may be implemented as a first pair of parallel analog-to-digital converters for in-phase and quadrature responses. The first response may be measured as a sample average, where M response samples are averaged to produce the first response. The quantity of "M" may also depend on the application and/or system. The first response may be measured as a moving average, where the first response is produced from a weighted moving average of consecutive response samples.

In block 1310, determine a first set of coefficients based on the first response. In various examples, a coefficient controller is used for determining the first set of coefficients. Known algorithms may be used by the coefficient controller for determining coefficients to apply in the AIC circuit for interference cancellation. Thus, specific algorithms to be used by the coefficient controller will not be discussed herein.

In various examples, the first set of coefficients when applied to the AIC circuit 416 would provide a filtered reference signal 405 that minimizes a cost function associated with the first response. Minimizing the cost function may be implemented, for example, by using a least mean square (LMS) error criterion on the first response. For example, the desire is to determine a first set of coefficients that would minimize a first quadratic error function associated with the first response. The determination of the first set of coefficients may be performed by a coefficient controller 450.

In block 1315, enable the second transmit path and disable the first transmit path to measure a second response. A switch (or an equivalent component) may be used to enable and disable the different transmit paths. The second response may be measured from a second analog-to-digital converter with N bits of precision and a sample rate R. The quantities of "N" and "R" may be any quantities appropriate for the application and/or system as determined by the user and/or system designer. The second analog-to-digital converter may be implemented as a second pair of parallel analog-to-digital converters for in-phase and quadrature responses. The second response may be measured as a sample average, where M response samples are averaged to produce the second response. The quantity of "M" may also depend on the application and/or system. The second response may be measured as a moving average, where the second response is produced from a weighted moving average of consecutive response samples.

In block 1320, determine a second set of coefficients based on the second response. The second response may include a desired signal, an interference signal and/or thermal noise. The interference signal and/or thermal noise are undesirable. In various examples, the second response is measured at the output of the receiver. In various examples, the coefficient controller is used for determining the second set of coefficients. In various examples, the second set of coefficients when applied to the AIC circuit 416 would provide a filtered reference signal 405 that minimizes a cost function associated with the second response. The filtered reference signal in block 1320 may be the same as the filtered reference signal in block 1310 (in the case of a single AIC circuit as in FIG. 6) or may be different filtered reference signals (in the case of two AIC circuits as in FIG. 7).

Minimizing the cost function may be implemented, for example, by using a least mean square (LMS) error criterion on the second response. For example, the desire is to determine a second set of coefficients that would minimize a second quadratic error function associated with the second response. The determination of the second set of coefficients may be performed by a coefficient controller. The coefficient controller used for determining the first set of coefficients and the coefficient controller for determining the second set of coefficients may be the same coefficient controller or may be two different coefficient controllers.

In block 1325, apply the first set of coefficients to a first adaptive filter and the second set of coefficients to a second adaptive filter for the interference cancellation. In various examples, the first adaptive filter and/or the second adaptive filter is a single tap least mean square (LMS) filter. In various examples, the first and second adaptive filter are the same adaptive filter. An adder 413 (or an equivalent switch operation) is implemented at the input to the single adaptive filter to select one of the two pre-filtered (i.e., pre-BPF 414) reference signals outputted from the respective transmitter couplers 412a, 412b.

Figure 14A:
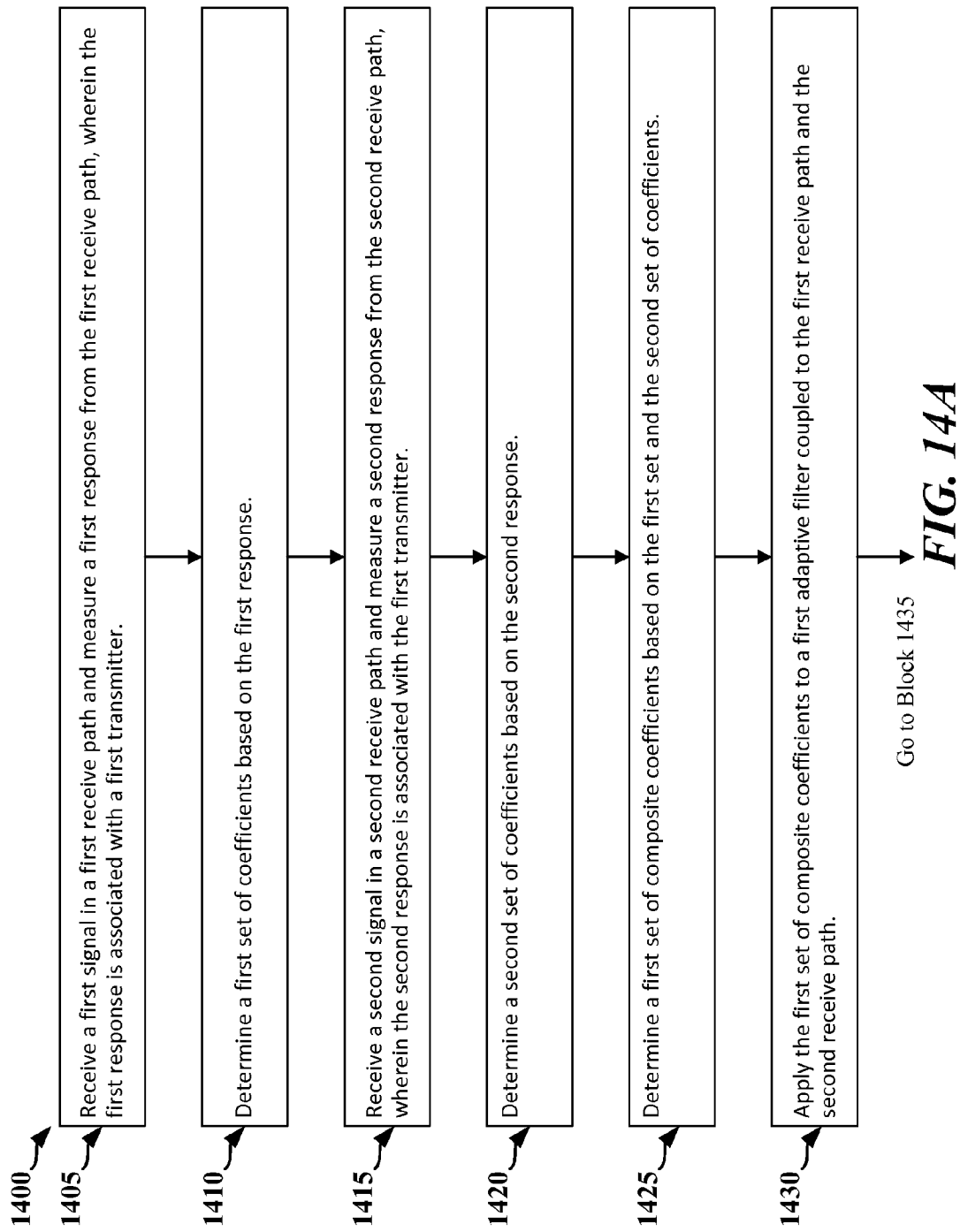
FIGS. 14A and 14B are a flow diagram illustrating a third example of interference cancellation with multiple antennas.
Figure 14B:
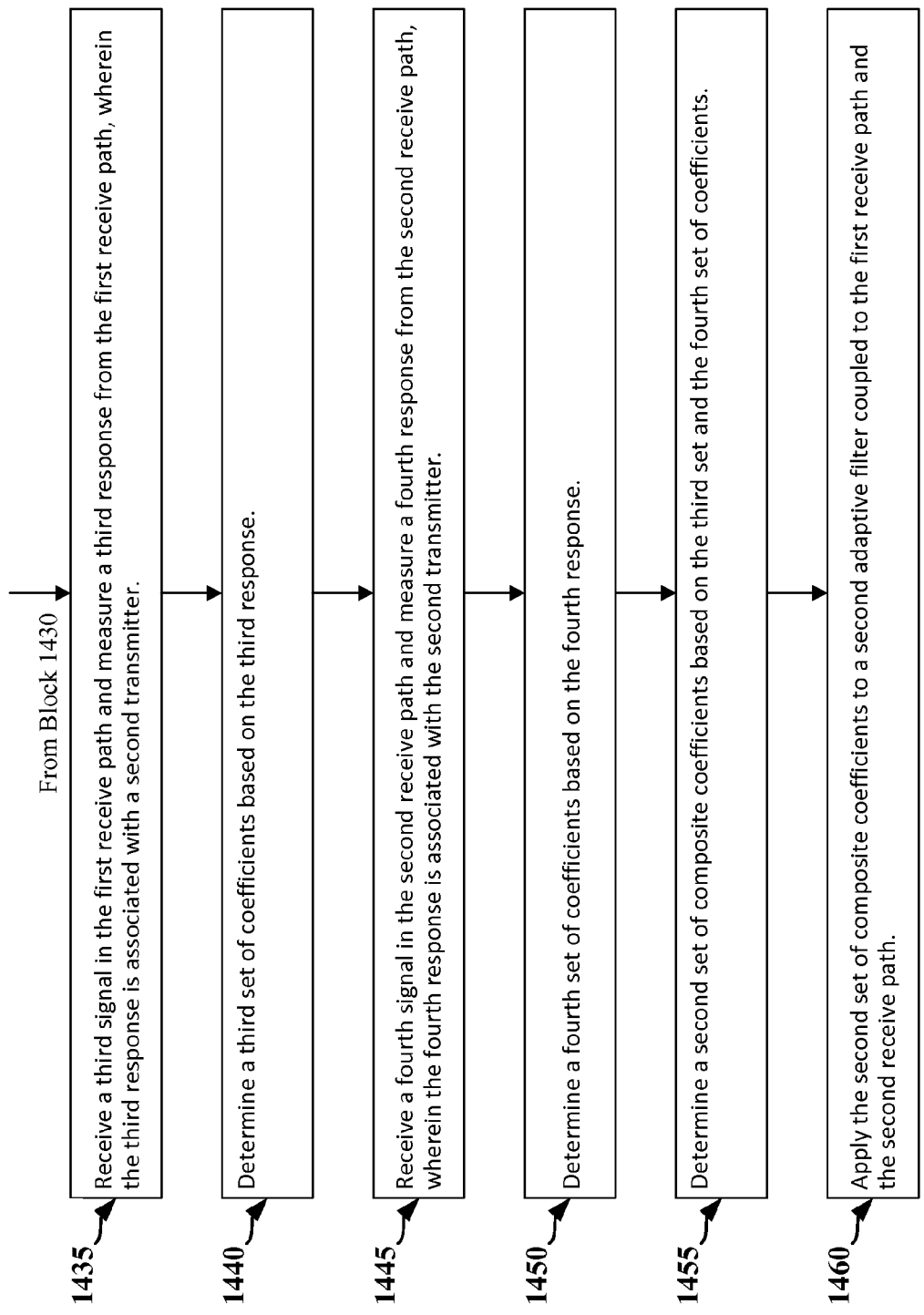

FIG. 14 is a flow diagram illustrating a third example of interference cancellation with multiple antennas. In FIG. 14, composite coefficients are applied for transmit interference mitigation in the case of multiple transmitters and multiple receivers, for example, two transmitters and two receivers. In various examples, the flow diagram of FIG. 14 applies to a multiple input multiple output (MIMO) case which may include more than two transmitters and/or more than two receivers.

The method may also be performed by a device having two or more transmitters and two or more receivers. In various examples, the one or more transmitters and receivers both operate in accordance with the same radio access technology (RAT). In another example, the device is configured to transmit signals in accordance with a first RAT while receiving signals transmitted in accordance with a second RAT. Additionally, the components described in FIGS. 10 and 11 may be implemented to perform some or all the blocks of the flow diagram in FIG. 14.

In block 1405, receive a first signal in a first receive path and measure a first response from the first receive path, wherein the first response is associated with a first transmitter. The first response may include a desired signal, an interference signal and/or thermal noise. The interference signal and/or thermal noise are undesirable. In various examples, the first response is measured at the output of a first receiver. In various examples, the first receiver receives the first signal.

In block 1410, determine a first set of coefficients based on the first response. In various examples, the first set of coefficients when applied to the AIC circuit 416 would provide a filtered reference signal 405 that minimizes a cost function associated with the first response. Minimizing the cost function may be implemented, for example, by using a least mean square (LMS) error criterion on the first response. For example, the desire is to determine a first set of coefficients that would minimize a first quadratic error function associated with the first response. The determination of the first set of coefficients may be performed by a first coefficient controller 450a. Known algorithms may be used by the first coefficient controller for determining coefficients to apply in the AIC circuit for interference cancellation. Thus, specific algorithms to be used by the first coefficient controller will not be discussed herein.

In block 1415, receive a second signal in a second receive path and measure a second response from the second receive path, wherein the second response is associated with the first transmitter. In various examples, a second receiver receives the second signal. The second response may include a desired signal, an interference signal and/or thermal noise. The interference signal and/or thermal noise are undesirable. In various examples, the second response is measured at the output of the second receiver.

In block 1420, determine a second set of coefficients based on the second response. In various examples, the second set of coefficients when applied to the AIC circuit 416 would provide a filtered reference signal 405 that minimizes a cost function associated with the second response. Minimizing the cost function may be implemented, for example, by using a least mean square (LMS) error criterion on the second response. For example, the desire is to determine a second set of coefficients that would minimize a second quadratic error function associated with the second response. The determination of the second set of coefficients may be performed by the first coefficient controller 450a.

In block 1425, determine a first set of composite coefficients based on the first set and the second set of coefficients. A weighted sum of the first set of coefficients and the second set of coefficients may be used for determining the first set of composite coefficients. Weighting criteria may depend on the system and thus may be a default formula preset by the system designer or selected by the user at the time of the interference cancellation.

In various examples, the first coefficient controller is used to determine the first set of composite coefficients. Known algorithms may be used by the first coefficient controller for determining coefficients to apply in an AIC circuit for interference cancellation. Thus, specific algorithms to be used by the first coefficient controller will not be discussed herein. The first coefficient controller is shared among the first and second receive paths. That is, although there are two receivers, only one coefficient controller is used to determine the coefficients to be inputted to the adaptive filter that is coupled to the receivers. The adaptive filter may be a single tap least mean square (LMS) filter. The first coefficient controller determines the first set of composite coefficients by, for example, minimizing a first composite quadratic error function, wherein the first composite quadratic error function is a superposition of the first and second quadratic error functions.

In block 1430, apply the first set of composite coefficients to a first adaptive filter coupled to the first receive path and the second receive path. In various examples, the first adaptive filter is a single tap least mean square (LMS) filter.

In block 1435, receive a third signal in the first receive path and measure a third response from the first receive path, wherein the third response is associated with a second transmitter. In various examples, the first receiver receives the third signal. The third response may include a desired signal, an interference signal and/or thermal noise. The interference signal and/or thermal noise are undesirable. In various examples, the third response is measured at the output of the first receiver.

In block 1440, determine a third set of coefficients based on the third response. In various examples, the third set of coefficients when applied to the AIC circuit 416 would provide a filtered reference signal 405 that minimizes a cost function associated with the third response. Minimizing the cost function may be implemented, for example, by using a least mean square (LMS) error criterion on the third response. For example, the desire is to determine a third set of coefficients that would minimize a third quadratic error function associated with the third response. The determination of the third set of coefficients may be performed by a second coefficient controller 450b.

In block 1445, receive a fourth signal in the second receive path and measure a fourth response from the second receive path, wherein the fourth response is associated with the second transmitter. In various examples, the second receiver receives the fourth signal. The fourth response may include a desired signal, an interference signal and/or thermal noise. The interference signal and/or thermal noise are undesirable. In various examples, the fourth response is measured at the output of the second receiver.

In block 1450, determine a fourth set of coefficients based on the fourth response. In various examples, the fourth set of coefficients when applied to the AIC circuit 416 would provide a filtered reference signal 405 that minimizes a cost function associated with the fourth response. Minimizing the cost function may be implemented, for example, by using a least mean square (LMS) error criterion on the fourth response. For example, the desire is to determine a fourth set of coefficients that would minimize a fourth quadratic error function associated with the fourth response. The determination of the fourth set of coefficients may be performed by the second coefficient controller 450b.

In block 1455, determine a second set of composite coefficients based on the third set and the fourth set of coefficients. A weighted sum of the third set of coefficients and the fourth set of coefficients may be used for determining the second set of composite coefficients. Weighting criteria may depend on the system and thus may be a default formula preset by the system designer or selected by the user at the time of the interference cancellation.

In various examples, the second coefficient controller is used to determine the second set of composite coefficients. Known algorithms may be used by the second coefficient controller for determining coefficients to apply in an AIC circuit for interference cancellation. Thus, specific algorithms to be used by the second coefficient controller will not be discussed herein. The second coefficient controller is shared among the first and second receive paths. That is, although there are two receivers, only one coefficient controller is used to determine the coefficients to be inputted to the adaptive filter that is coupled to the receivers. The adaptive filter may be a single tap least mean square (LMS) filter. The second coefficient controller determines the second set of composite coefficients by, for example, minimizing a second composite quadratic error function, wherein the second composite quadratic error function is a superposition of the third and fourth quadratic error functions. In other examples, the first and second coefficient controllers are the same coefficient controller. That is, one shared coefficient controller determines the first set and the second set of composite coefficients.

In block 1460, apply the second set of composite coefficients to a second adaptive filter coupled to the first receive path and the second receive path. In various examples, the second adaptive filter is a single tap least mean square (LMS) filter.

Several aspects of a telecommunications system have been presented. As those skilled in the art will readily appreciate, various aspects described throughout this disclosure may be extended to various types of telecommunication systems, network architectures and communication standards.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is not directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, blocks, features and/or functions illustrated in the figures may be rearranged and/or combined into a single component, block, feature or function or embodied in several components, blocks, or functions. Additional elements, components, blocks, and/or functions may also be added without departing from novel features disclosed herein. The apparatus, devices, and/or components illustrated in the various drawings may be configured to perform one or more of the methods, features, or blocks described herein. The novel algorithms described herein may also be efficiently implemented in software and/or embedded in hardware.

It is to be understood that the specific order or hierarchy of blocks in the methods disclosed is an illustration of exemplary processes. Based upon design preferences, it is understood that the specific order or hierarchy of blocks in the methods may be rearranged. The accompanying method claims present elements of the various blocks in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for interference cancellation, comprising:
utilizing a first receiver to receive a first signal in a first receive path and to measure a first response from the first receive path;
determining a first set of coefficients based on the first response;
utilizing a second receiver to receive a second signal in a second receive path and to measure a second response from the second receive path;
determining a second set of coefficients based on the second response;
determining a set of composite coefficients based on the first set and the second set of coefficients; and
applying the set of composite coefficients to an adaptive filter coupled to the first receive path and the second receive path.

2. The method of claim 1, further comprising utilizing one shared coefficient controller for determining the set of composite coefficients to be applied to the adaptive filter coupled to the first receive path and the second receive path.

3. The method of claim 2, wherein the shared coefficient controller uses a least mean square (LMS) error criterion.

4. The method of claim 2, wherein the adaptive filter comprises a first filter and a second filter with the first filter coupled to the first receive path and the second filter coupled to the second receive path.

5. The method of claim 1, wherein the adaptive filter is a single tap least mean square (LMS) filter.

6. The method of claim 1, further comprising:
enabling the first receive path; and
disabling the second receive path for measuring the first response.

7. The method of claim 6, further comprising enabling the first receive path utilizing a switch and disabling the second receive path utilizing the switch.

8. The method of claim 6, further comprising:
enabling the second receive path; and
disabling the first receive path for measuring the second response.

9. The method of claim 8, further comprising enabling the second receive path utilizing a switch and disabling the first receive path utilizing the switch.

10. The method of claim 1, further comprising utilizing a weighted sum of the first set of coefficients and the second set of coefficients for determining the set of composite coefficients.

11. The method of claim 1, further comprising minimizing a first quadratic error function of the first response for determining the first set of coefficients.

12. The method of claim 11, further comprising minimizing a second quadratic error function of the second response for determining the second set of coefficients.

13. The method of claim 12, further comprising minimizing a composite quadratic error function for determining the set of composite coefficients, wherein the composite quadratic error function is a superposition of the first and the second quadratic error functions.

14. A method for interference cancellation, comprising:
enabling a first transmit path and disabling a second transmit path to measure a first response;
utilizing a coefficient controller for determining a first set of coefficients based on the first response and minimizing a first quadratic error function of the first response for the determining the first set of coefficients;
enabling the second transmit path and disabling the first transmit path to measure a second response;
utilizing the coefficient controller for determining a second set of coefficients based on the second response;
applying the first set of coefficients to a first adaptive filter and the second set of coefficients to a second adaptive filter for the interference cancellation.

15. The method of claim 14, further comprising minimizing a second quadratic error function of the second response for the determining the second set of coefficients.

16. The method of claim 14, wherein the first adaptive filter and the second adaptive filter are each a single tap least mean square (LMS) filter.

17. The method of claim 14, wherein the first adaptive filter and the second adaptive filter are the same adaptive filter.

18. A method for interference cancellation, comprising:
utilizing a first receiver to receive a first signal in a first receive path and to measure a first response from the first receive path, wherein the first response is associated with a first transmitter;
determining a first set of coefficients based on the first response;
utilizing a second receiver to receive a second signal in a second receive path and to measure a second response from the second receive path, wherein the second response is associated with the first transmitter;
determining a second set of coefficients based on the second response;
determining a first set of composite coefficients based on the first set and the second set of coefficients;
applying the first set of composite coefficients to a first adaptive filter coupled to the first receive path and the second receive path;
utilizing the first receiver to receive a third signal in the first receive path and to measure a third response from the first receive path, wherein the third response is associated with a second transmitter;
determining a third set of coefficients based on the third response;
utilizing the second receiver to receive a fourth signal in the second receive path and to measure a fourth response from the second receive path, wherein the fourth response is associated with the second transmitter;
determining a fourth set of coefficients based on the fourth response;
determining a second set of composite coefficients based on the third set and the fourth set of coefficients; and applying the second set of composite coefficients to a second adaptive filter coupled to the first receive path and the second receive path.

19. The method of claim 18, wherein the first adaptive filter and the second adaptive filter are each a single tap least mean square (LMS) filter.

20. The method of claim 18, further comprising utilizing one shared coefficient controller for determining the first set and the second set of composite coefficients.

21. The method of claim 18, further comprising utilizing a weighted sum of the first set of coefficients and the second set of coefficients for determining the first set of composite coefficients.

22. The method of claim 18, further comprising utilizing a weighted sum of the third set of coefficients and the fourth set of coefficients for determining the second set of composite coefficients.

23. The method of claim 18, further comprising minimizing a first quadratic error function of the first response for determining the first set of coefficients.

24. The method of claim 23, further comprising minimizing a second quadratic error function of the second response for determining the second set of coefficients.

25. The method of claim 24, further comprising minimizing a first composite quadratic error function for determining the first set of composite coefficients, wherein the first composite quadratic error function is a superposition of the first and the second quadratic error functions.

26. The method of claim 18, further comprising minimizing a third quadratic error function of the third response for determining the third set of coefficients.

27. The method of claim 26, further comprising minimizing a fourth quadratic error function of the fourth response for determining the fourth set of coefficients.

28. The method of claim 27, further comprising minimizing a second composite quadratic error function for determining the second set of composite coefficients, wherein the second composite quadratic error function is a superposition of the third and the fourth quadratic error functions.

29. An apparatus for interference cancellation, comprising:
a first receiver for receiving a first signal in a first receive path;
a second receiver for receiving a second signal in a second receive path;
a coefficient controller for performing the following:
measuring a first response from the first receive path;
determining a first set of coefficients based on the first response;
measuring a second response from the second receive path;
determining a second set of coefficients based on the second response; and
determining a set of composite coefficients based on the first set and the second set of coefficients; and
an analog interference cancellation (AIC) circuit for applying the set of composite coefficients to an adaptive filter coupled to the first receive path and the second receive path.

* * * * *